US012590814B2

(12) United States Patent
Li et al.

(10) Patent No.: US 12,590,814 B2
(45) Date of Patent: Mar. 31, 2026

(54) INDOOR MAP GENERATION METHOD AND APPARATUS

(71) Applicant: Huawei Technologies Co., Ltd., Shenzhen (CN)

(72) Inventors: Zhi Li, Xi'an (CN); Dandan Zeng, Beijing (CN); Yongliang Wang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 321 days.

(21) Appl. No.: 18/157,710

(22) Filed: Jan. 20, 2023

(65) Prior Publication Data

US 2023/0152121 A1 May 18, 2023

Related U.S. Application Data

(63) Continuation of application No. PCT/CN2021/109389, filed on Jul. 29, 2021.

(30) Foreign Application Priority Data

Jul. 30, 2020 (CN) ........................ 202010750182.X

(51) Int. Cl.
| *G01C 21/00* | (2006.01) |
| *G01C 21/12* | (2006.01) |
| *G01C 21/32* | (2006.01) |

(52) U.S. Cl.
CPC ........... *G01C 21/383* (2020.08); *G01C 21/12* (2013.01); *G01C 21/32* (2013.01); *G01C 21/3841* (2020.08)

(58) Field of Classification Search
CPC ...... G01C 21/383; G01C 21/12; G01C 21/32; G01C 21/3841; G01C 21/206
See application file for complete search history.

(56) References Cited

U.S. PATENT DOCUMENTS

| 10,375,517 B2 | 8/2019 | Shen et al. | |
| 2018/0017406 A1* | 1/2018 | Semnani | G01C 21/206 |
| 2018/0245927 A1* | 8/2018 | Frish | G01C 21/3841 |

FOREIGN PATENT DOCUMENTS

| CN | 105263113 A | 1/2016 |
| CN | 109819406 A | 5/2019 |

* cited by examiner

*Primary Examiner* — Hitesh Patel
*Assistant Examiner* — Joshua Jeffrey Penko
(74) *Attorney, Agent, or Firm* — WOMBLE BOND DICKINSON (US) LLP

(57) ABSTRACT

This application provides an indoor map generation method and apparatus. In the method, a plurality of first tracks are obtained based on a PDR algorithm. A plurality of first target tracks are further selected from the plurality of first tracks, and at least one second track corresponding to each first target track is extended to the first target track based on the first target track, to obtain a branch. The obtained branches are combined, to obtain a map.

20 Claims, 13 Drawing Sheets

Obtain a plurality of first tracks based on information collected, within a period of time, by sensors in a plurality of terminal devices and based on a pedestrian dead reckoning algorithm — 401

Select a plurality of first target tracks from the plurality of first tracks — 402

Extend, to the first target track based on each first target track, at least one second track corresponding to the first target track, to obtain one branch — 403

Combine a plurality of branches obtained based on the plurality of first target tracks, to obtain a map — 404

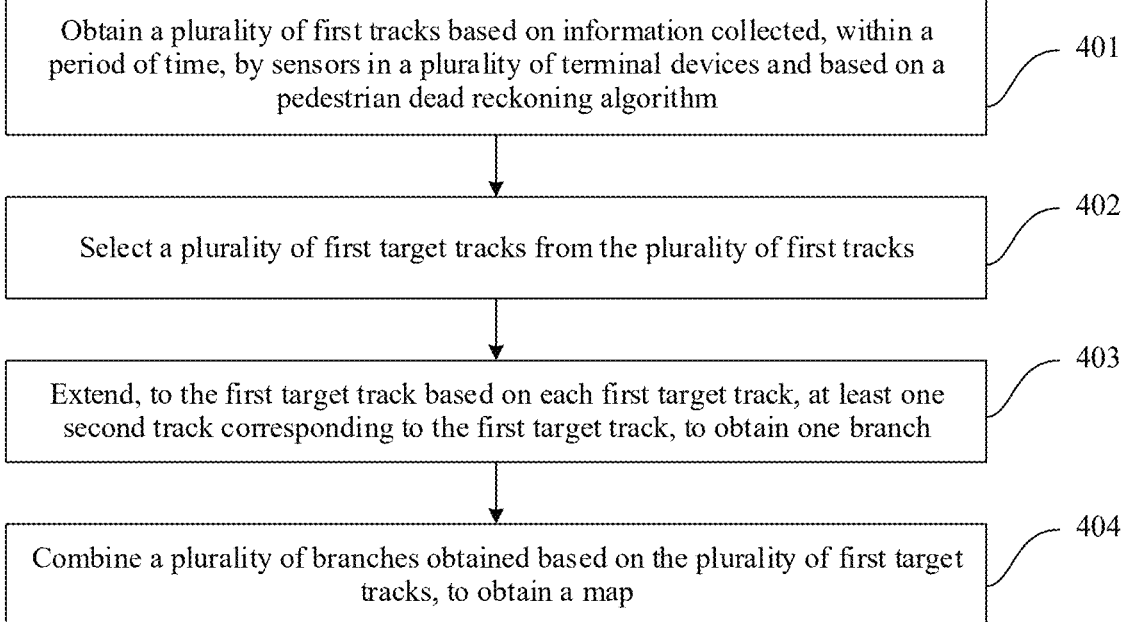

Obtain a plurality of first tracks based on information collected, within a period of time, by sensors in a plurality of terminal devices and based on a pedestrian dead reckoning algorithm — 401

Select a plurality of first target tracks from the plurality of first tracks — 402

Extend, to the first target track based on each first target track, at least one second track corresponding to the first target track, to obtain one branch — 403

Combine a plurality of branches obtained based on the plurality of first target tracks, to obtain a map — 404

FIG. 4 a            b            c a                                    b

INDOOR MAP GENERATION METHOD AND APPARATUS

CROSS-REFERENCE TO RELATED APPLICATIONS

This application is a continuation of International Application No. PCT/CN2021/109389, filed on Jul. 29, 2021, which claims priority to Chinese Patent Application No. 202010750182.X, filed on Jul. 30, 2020. The disclosures of the aforementioned applications are hereby incorporated by reference in their entirety.

TECHNICAL FIELD

This application relates to the field of positioning technologies, and in particular, to an indoor map generation method and apparatus.

BACKGROUND

Currently, a mobile communications service, a commercial transaction, and public entertainment mostly occur indoors. With large-scale popularization of intelligent terminals and 5G network communications, a position service and an application in an environment of an indoor scenario such as a shopping mall, an office park, an airport station, an underground garage, or a hospital are increasingly required, for example, indoor map navigation, a position search, shop-level advertisement push, and a value-added service.

Currently, an indoor positioning technology used in the industry usually includes two parts: offline collection and online positioning. Offline collection is to establish an indoor fingerprint database in a manual collection manner, and online positioning is that a user initiates a positioning request, to implement positioning by matching a fingerprint currently obtained through scanning and the fingerprint database.

However, in a solution in the conventional technology, establishment of the indoor fingerprint database needs to depend on the indoor map, and is greatly affected by an indoor environment structure.

SUMMARY

This application provides an indoor map generation method and apparatus, to reduce dependency on an indoor map.

According to a first aspect, an embodiment of this application provides an indoor map generation method. The method may be performed by a server. The server may be one server or a server cluster including several servers. In the method, a plurality of first tracks may be obtained based on information collected by sensors in a plurality of terminal devices within a period of time and based on a pedestrian dead reckoning (PDR) algorithm. The sensor in the terminal device may include at least one of a gyroscope, an accelerometer, or a magnetometer. One first track indicates a curve including a position movement of one terminal device in the period of time, and the first track includes a plurality of step points of the terminal device on a same floor of a building in a process of the position movement.

In the method, a plurality of first target tracks may be further selected from the plurality of first tracks. An accuracy rate of the plurality of first target tracks is higher than that of a plurality of second tracks, the plurality of first target tracks are some tracks in the plurality of first tracks, and the plurality of second tracks are the other tracks in the plurality of first tracks. The accuracy rate herein may be an accuracy rate of a motion curve that is of the terminal device and that is reflected by the track. For example, the first target track may be a track with a long length in the first track. After the plurality of first target tracks are selected, at least one second track corresponding to each first target track and the first target track are further connected based on the first target track, to obtain one branch. The branch includes the first target track and the at least one second track corresponding to the first target track. It should be noted that, when the at least one second track corresponding to the first target track is connected to the first target track, each second track may be spliced with the first target track. An endpoint of each second track may be connected to an endpoint of the first target track. For example, for any endpoint of the first target track, a first endpoint that is of each second track and that corresponds to the any endpoint may be determined, and each second track is connected to the first target track based on the any endpoint and the first endpoint. Alternatively, each second track may be connected to the first target track based on a track on which each second track overlaps the first target track. For example, the first target track may be spliced together with the track on which each second track overlaps the first target track. Alternatively, if a track on which the first target track overlaps any second track does not exist, the any second track and the first target track may be connected together by using an extension line. A direction of the extension line herein may conform to a direction in which an endpoint of the any second track is extended to the endpoint of the first target track. In the method, a plurality of branches obtained based on the plurality of first target tracks may be further combined, to obtain a map.

According to this solution, to generate the map, the first tracks obtained based on the information collected by the sensors of the plurality of terminal devices are combined to obtain the map, and a map generation process does not depend on an indoor map or an indoor structure, and the map is obtained by combining tracks generated based on the information collected by the sensor of the terminal device. Because the solution does not depend on the indoor map, the map may still be generated for indoor positioning in a scenario in which there is no indoor map. In addition, because the solution does not depend on the indoor structure, the map may still be generated for indoor positioning in a scenario in which the indoor structure is complex and connectivity is weak.

In an embodiment, each target track may further include at least one radio frequency fingerprint point. One radio frequency fingerprint point indicates a radio signal source obtained by one of the plurality of terminal devices through scanning in the process of the position movement. A radio frequency fingerprint point included on the at least one second track corresponding to the first target track matches a radio frequency fingerprint point on the first target track.

According to this solution, the at least one second track matching the first target track may be determined based on the radio frequency fingerprint point. Because the radio frequency fingerprint point indicates the radio signal source obtained by the terminal device through scanning in the process of the position movement, the at least one second track matching the first target track may be accurately determined based on the radio frequency fingerprint point.

In an embodiment, when the at least one second track corresponding to each first target track and the first target track are connected based on the first target track, a second track that includes a radio frequency fingerprint point matching a first radio frequency fingerprint point included on the first target track may be extended to the first target track based on the first radio frequency fingerprint point, to obtain one branch. When it is determined that the first radio frequency fingerprint point on the first target track matches the radio frequency fingerprint point on the second track, a similarity between the first radio frequency fingerprint point on the first target track and the radio frequency fingerprint point on the second track may be calculated. The similarity $$\text{Similar}\!\left(S_{ref}^{i},\, S_{cur}^{i}\right)$$

may satisfy the following formula:

$$\text{Similar}\!\left(S_{ref}^{i},\, S_{cur}^{i}\right) = \exp\!\left(-\frac{d-A}{B}\right)$$

Herein, i=(1, 2, . . . , n), j=(1, 2, 3, . . . , m), A and B each are a constant, $$S_{ref}^{i}$$

represents an $i^{th}$ radio frequency fingerprint point on the first target track, and $$S_{cur}^{j}$$

represents a $j^{th}$ radio frequency fingerprint point on a $j^{th}$ second track. Herein, A and B may be predetermined based on an empirical value. For example, A may be 4.8, and B may be 8.0.

Herein, d is a distance between the $i^{th}$ radio frequency fingerprint point on the first target track and the $j^{th}$ radio frequency fingerprint point on the second track. The distance d satisfies the following formula:

$$d = \frac{\sum_{k}^{P \cap Q}\left|Rssi_{ref}^{i} - Rssi_{cur}^{j}\right| \cdot w_{k}}{\sum_{k}^{P \cap q} w_{k}}$$

Herein, P represents a quantity of radio frequency fingerprint points on the first target track, Q represents a quantity of radio frequency fingerprint points on the second track, $$Rssi_{ref}^{i}$$

may represent signal strength of the $i^{th}$ radio frequency fingerprint point on the first target track, $$Rssi_{cur}^{j}$$

may represent signal strength of the $j^{th}$ radio frequency fingerprint point on the second track, and $w_{k}$ represents a weight of a $k^{th}$ radio signal source (access point, AP) corresponding to the $i^{th}$ radio frequency fingerprint point on the first target track and the $j^{th}$ radio frequency fingerprint point on the second track. It should be understood that a radio signal source corresponding to the radio frequency fingerprint point may be an AP obtained, through scanning, by the terminal device that obtains the radio frequency fingerprint point. For example, because crowdsourcing further includes radio frequency fingerprint information, each piece of radio frequency fingerprint information may include an identifier and signal strength of the AP. Therefore, the radio frequency fingerprint point also corresponds to the identifier and the signal strength of the AP.

According to this solution, the radio frequency fingerprint point that is on the second track and that matches the radio frequency fingerprint point on the first target track may be determined, and the second track may be extended to the first target track based on the mutually matched radio frequency fingerprint points, to obtain one branch. The branch may be a part of the indoor map. Because the indoor map is generated through growth and combination of tracks, the indoor map and indoor structure are not relied on.

In an embodiment, for each branch, a coordinate system of the second track may be corrected to a coordinate system of the first target track corresponding to the second track. When the coordinate system of the second track is corrected, a similarity transformation T of the second track relative to the first target track may be obtained based on the following two expressions.

First, an error function between radio frequency fingerprint points on the first target track and the second track may be calculated. The error function F satisfies the following formula:

$$F = \sum_{a=1}^{z}\left(S_{ref}^{i} - T \cdot S_{cur}^{i}\right)^{2} \cdot w_{k}$$

Herein, z is a positive integer, and T is a similarity transformation between the $i^{th}$ radio frequency fingerprint point on the first target track and the $j^{th}$ radio frequency fingerprint point on the second track. A value of T may be adjusted, to obtain a minimum value of F. The similarity transformation T satisfies the following formula:

$$T = \begin{bmatrix} s \cdot \cos\theta & s \cdot \sin\theta & t_{x} \\ -s \cdot \sin\theta & s \cdot \cos\theta & t_{y} \end{bmatrix}$$

Herein, s represents a scale factor, $\theta$ represents an angle at which the second track rotates relative to the first target track, $t_{x}$ represents a lateral translation amount of the second track relative to the first target track, and $t_{y}$ represents a longitudinal translation amount of the second track relative to the first target track. Therefore, the value of T can be adjusted by changing s, $\theta$, $t_{x}$, and $t_{y}$, to find a value of T that is used to obtain the minimum value of F.

According to this solution, the coordinate system of the second track may be corrected to the coordinate system of the first target track, so that coordinate systems of branches obtained by combining the first target track and the second track are unified.

In an embodiment, when the plurality of branches are combined, the plurality of branches may be combined based on mutually matched radio frequency fingerprint points in the plurality of branches, to obtain the map.

According to this solution, the plurality of branches can be combined based on mutually matched radio frequency fingerprint points of branches, to obtain a map. Therefore, the map generation process does not depend on the indoor map or the indoor structure, but is obtained based on information from the sensor of the terminal device.

In an embodiment, there is a mapping relationship between an identifier of a radio frequency fingerprint point of the branch, signal strength, and a MAC value.

According to this solution, because there is a mapping relationship between the identifier of the radio frequency fingerprint point of the branch, the signal strength, and the media access control (media access control, MAC) value, the mutually matched radio frequency fingerprint points of the branches are searched for based on the mapping relationship, to improve branch combination efficiency.

In an embodiment, mutually matched radio frequency fingerprint points of at least two branches correspond to a same MAC value, and a difference between signal strength of the mutually matched radio frequency fingerprint points falls within a preset range. The preset range herein may be determined based on an empirical value.

For example, for a branch 1 and a branch 2, radio frequency fingerprint points corresponding to a MAC value 1 include t1, t2, and t3 of the branch 1 and t4, 15, and t6 of the branch 2. If a difference between signal strength of t1 and t4 falls within the preset range, it may be considered that t1 and t4 are third target radio frequency fingerprint points. If a difference between signal strength of t1 and t4 does not fall within the preset range, a difference between signal strength of t1 and t5 may be calculated, and so on, to obtain mutually matched radio frequency fingerprint points that are of the branch 1 and the branch 2 and that correspond to the MAC value 1. In addition, mutually matched radio frequency fingerprint points that are of the branch 1 and the branch 3 and that correspond to the MAC value 1 may be further obtained, and mutually matched radio frequency fingerprint points that are of the branch 1 and the branch 2 and that correspond to a MAC value 2 may be further obtained. The plurality of branches are combined after the mutually matched radio frequency fingerprint points of the plurality of branches are obtained.

According to this solution, because one branch includes a large quantity of radio frequency fingerprint points, the mutually matched radio frequency fingerprint points of the branches may be determined by searching for radio frequency fingerprint points corresponding to a same MAC value in the branches, and the branches may be combined based on the mutually matched radio frequency fingerprint points, to improve branch combination efficiency.

In an embodiment, a plurality of third tracks may be further obtained based on the information collected by the sensors in the plurality of terminal devices within the period of time and based on the PDR algorithm. One third track indicates a curve including the position movement of the terminal device in the period of time, and the third track includes step points of the terminal device on a plurality of floors in the process of the position movement. Each third track may be segmented by floor, to obtain the plurality of first tracks.

According to this solution, a cross-layer track may be segmented, to obtain a same-layer track, and the indoor map is generated based on the same-layer track. A change of the information collected by the sensors in the same-layer track relative to the radio frequency fingerprint point is stable. Therefore, an accuracy rate of the generated indoor map is high.

In an embodiment, the plurality of first target tracks may be tracks whose scores are higher than a first threshold in a plurality of fourth tracks. One fourth track is a part that is of one first track and whose accuracy rate is higher than a second threshold. For example, the plurality of first tracks are obtained based on the PDR algorithm, and the first track is generated based on the information collected by the sensor of the terminal device within the period of time. If the information collected by the sensor has noise, an accuracy rate of the generated track is low. Therefore, the first track may be segmented, to obtain a track with a high accuracy rate. The first threshold and the second threshold herein may be determined based on an empirical value.

According to this solution, the first track may be segmented, to remove a part that is of the first track and whose information collected by the sensor has large noise. A part that is of the first track and whose accuracy rate is high is used, to improve an accuracy rate of the generated map. In addition, the plurality of first target tracks are selected from a fourth track with a high accuracy rate, to improve an accuracy rate of the first target track.

In an embodiment, the first target track may be a track whose score is higher than a third threshold in a plurality of fifth tracks, and the plurality of fifth tracks are obtained by segmenting the first track based on an inflection point on the first track. For example, the fifth track may be a track that is a straight line in the first track. The third threshold herein may be determined based on an empirical value.

According to this solution, the first track may be segmented, a part that is of the track and that is a straight line segment is selected as a fifth track, and the plurality of first target tracks are selected from the plurality of fifth tracks, to improve an accuracy rate of the first target track.

In an embodiment, each first track may be further scored based on the information collected by the sensor used when the first track is generated, a length of the first track, and an inflection point in the first track. After each first track is scored, the plurality of first target tracks may be selected from the plurality of first tracks. The plurality of first target tracks may be some tracks whose scores are greater than or equal to the first value in the plurality of first tracks. Alternatively, the scored first tracks may be sorted based on scores, and a first preset percentage of tracks with high scores may be selected as the first target track. For example, first 20% tracks with high scores may be selected as the first target track. When sorting is performed, sorting may be performed in descending order of scores, or sorting may be performed in ascending order of scores. Alternatively, the scored first tracks may be sorted based on the scores, and a first preset percentage of tracks with high scores may be selected, as the first target track, from tracks whose scores are greater than or equal to the first value.

According to this solution, the first track may be scored based on the information collected by the sensor used when the first track is generated, the length of the first track, and the inflection point on the first track, to represent an accuracy rate of the first track in a form of a score, and a first track with a high score is selected as the first target track, so that a plurality of first target tracks with a high accuracy rate can be conveniently selected from the plurality of first tracks.

In an embodiment, clustering may be performed separately on a plurality of inflection points in a first map obtained by combining the plurality of branches, to obtain clustering centers of the plurality of inflection points. The plurality of inflection points are located at connection points of the plurality of branches in the first map. It should be noted that, because the first map is obtained by combining the branches, some branches overlap or intersect. Therefore, some inflection points in the first map are actually a same point, and are represented as a cluster of points distributed closely on the map. Clustering in this step is to perform clustering on a group of inflection points that are actually a same point, separately performing clustering is to perform clustering on a plurality of clusters of points distributed closely, and one clustering center is obtained for one cluster of points. For a first inflection point, a track passing through the first inflection point may be traversed, to identify a second inflection point adjacent to the first inflection point. It should be understood that, that the second inflection point is adjacent to the first inflection point herein does not mean that the second inflection point is spatially adjacent to the first inflection point, and instead, means that the second inflection point is adjacent to the first inflection point in terms of connectivity of a region. In other words, the second inflection point adjacent to the first inflection point is in regional communication with the first inflection point, and the first inflection point and the second inflection point may be on a same track. The first inflection point is any inflection point on the first map, and a clustering center of the first inflection point is a first clustering center. A track between the first inflection point and the second inflection point may be corrected based on the first clustering center and a second clustering center, to obtain a second map. The second clustering center herein is a clustering center of the second inflection point. For example, the track between the first inflection point and the second inflection point may be translated, rotated, scaled, or the like, so that the first inflection point gets closer to the first clustering center, and the second inflection point gets closer to the second clustering center.

According to this solution, clustering is performed on the plurality of inflection points, to learn of inflection points that may be inflection points at a same position in space, the second inflection point adjacent to the first inflection point may be identified by traversing the track passing through the first inflection point, and the second clustering center that is of the second inflection point and that is adjacent to the first clustering center of the first inflection point may be obtained. Therefore, the track between the first inflection point and the second inflection point may be corrected based on a track between the first clustering center and the second clustering center, to improve an accuracy rate and an aggregation degree of the map.

In an embodiment, a relative coordinate system of the first map obtained by combining the plurality of branches may be corrected to an absolute coordinate system, to obtain a third map.

According to this solution, the relative coordinate system may be corrected to the absolute coordinate system, to obtain a map having the absolute coordinate system, and the map having the absolute coordinate system may be applied to an indoor positioning scenario.

In an embodiment, an entrance/exit position may be identified. For example, the entrance/exit position may be identified based on GPS data included in the crowdsourcing. From the outdoors to an entrance/exit, a GPS signal obviously changes from strong to weak, and the crowdsourcing further includes a timestamp. Therefore, a plurality of entrance/exit positions may be determined on a map obtained by combining the plurality of branches, based on a change of the GPS signal and the timestamp. For example, a timestamp of data collected by a sensor corresponding to each step point may be compared with a timestamp corresponding to a GPS signal, to determine the plurality of entrance/exit positions on the map. In addition, clustering may be performed on the plurality of entrance/exit positions on the map, to obtain clustering centers of the plurality of entrance/exit positions. A relative coordinate system of the map is corrected to an absolute coordinate system based on coordinates of a third clustering center on the map and longitude and latitude coordinates of the entrance/exit position, to obtain a corrected map. The third clustering center is any one of the clustering centers of the plurality of entrance/exit positions.

According to this solution, the entrance/exit position on the map may be identified to implement mapping of absolute coordinates, and mapping of the absolute coordinate system can be completed without depending on the indoor map. This is universally applicable.

In an embodiment, a first topological map of the map obtained by combining the plurality of branches and a second topological map of the indoor map may be further generated. In addition, the first topological map may be matched with the second topological map, to determine matched target points of the first topological map and the second topological map. Then, the coordinate system of the map may be converted into the absolute coordinate system based on coordinates of the target point on the indoor map and coordinates of the target point on the map, to obtain the corrected map.

According to this solution, in a scenario in which there is no indoor map, mapping of the absolute coordinate system can be implemented based on the indoor map and the topological map of the map, and the relative coordinate system of the map can be corrected to the absolute coordinate system accurately:

In an embodiment, the information collected by the sensors in the plurality of terminal devices within the period of time may come from crowdsourcing data collected by the plurality of terminal devices. The crowdsourcing data is data in crowdsourcing, and the data may be information carried in a data part of the crowdsourcing, or may be information in a packet header. The crowdsourcing comes from the plurality of terminal devices. For example, the crowdsourcing may include information collected by at least one sensor in a gyroscope, an accelerometer, a magnetometer, a barometer, a global positioning system (global positioning system, GPS) in a plurality of terminal devices within the period of time. The plurality of first tracks may be obtained from the crowdsourcing based on the PDR algorithm.

According to this solution, the map may be generated based on the information collected, within the period of time, by the sensors of the plurality of terminal devices included in the crowdsourcing, instead of manually collected data and manually annotated data, so as to reduce data obtaining costs and reduce labor costs.

According to a second aspect, an embodiment of this application further provides an indoor map generation apparatus. The apparatus may be configured to perform an operation in any one of the first aspect or the embodiments of the first aspect. For example, the apparatus may include a module/unit that is configured to perform each operation in any one of the first aspect or the embodiments of the first aspect. For example, the apparatus includes a storage unit and a processing unit.

According to a third aspect, an indoor map generation apparatus is provided. The apparatus includes a processor and a memory. The apparatus is configured to store computer-executable instructions. When a controller runs, the processor executes the computer-executable instructions in the memory, to perform operations of the method in any one of the first aspect or the embodiments of the first aspect by using a hardware resource in the controller.

According to a fourth aspect, an embodiment of this application provides a chip system, including a processor, and in an embodiment, further including a memory. The memory is configured to store a computer program, and the processor is configured to: invoke the computer program from the memory, and run the computer program, so that a communications apparatus on which the chip system is installed performs any method in any one of the first aspect or the embodiments of the first aspect.

According to a fifth aspect, an embodiment of this application provides a computer program product, including computer program code. When the computer program code is run by a transceiver unit and a processing unit or a transceiver and a processor of an apparatus, the apparatus is enabled to perform any method in any one of the first aspect or the embodiments of the first aspect.

According to a sixth aspect, an embodiment of this application provides a non-transitory computer-readable storage medium. The non-transitory computer-readable storage medium stores a program, and the program enables an apparatus to perform any method in any one of the first aspect or the embodiments of the first aspect.

In addition, for beneficial effects of the second aspect to the sixth aspect, refer to descriptions of corresponding beneficial effects in the first aspect. Details are not described herein again.

BRIEF DESCRIPTION OF DRAWINGS

FIG. 4 is an example flowchart of an indoor map generation method according to an embodiment of this application;

DESCRIPTION OF EMBODIMENTS

Figures 1, 2:
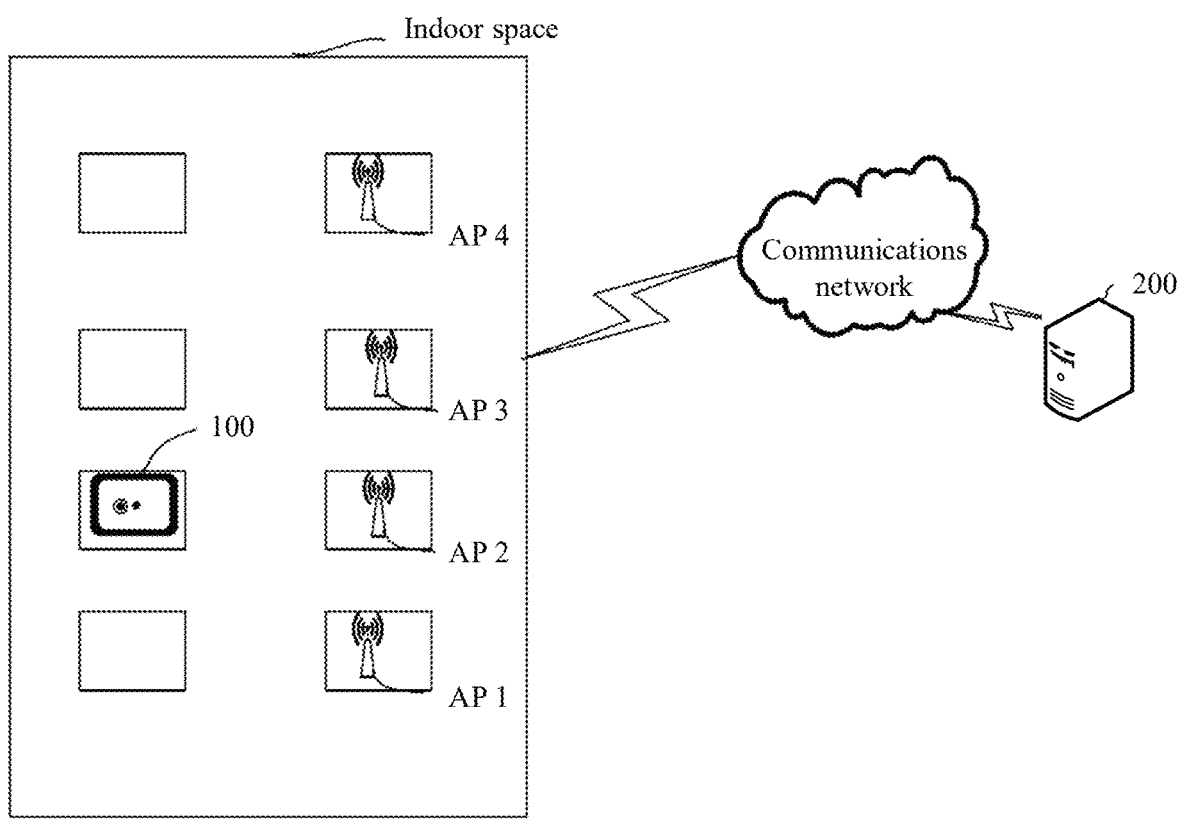
FIG. 1 is a schematic diagram of an architecture of an indoor positioning scenario.
FIG. 2 is a schematic diagram of a collection process of crowdsourcing.

To help understand the technical solutions provided in embodiments of this application, the following explains and describes nouns in embodiments of this application.

(1) A step point is a point that is generated based on information collected by a sensor within a period of time and that may represent a position.

(2) A radio frequency fingerprint point indicates a radio signal source obtained by a terminal device through scanning. One radio frequency fingerprint point corresponds to the following information of one radio signal source: an identifier of the radio signal source and signal strength of the radio signal source obtained by the terminal device through scanning.

(3) Crowdsourcing is an action of outsourcing a work task previously performed by an employee to a non-specific public volunteer in a form of a free resource. Crowdsourcing data may include information collected by a sensor of a terminal device of an anonymous public volunteer and radio frequency information. For example, the crowdsourcing data may be information collected by one or more sensors such as a magnetometer, an accelerometer, a gyroscope, and a barometer of the terminal device and radio frequency information obtained by the terminal device through scanning. A radio frequency may include Wi-Fi, Bluetooth, or the like.

In addition, it should be noted that, in embodiments of this application, because crowdsourcing includes a timestamp, a radio frequency fingerprint point may be in a one-to-one correspondence with the step point. In this case, one point on a track may represent both the step point and the radio frequency fingerprint point. In other words, one point may correspond to information collected by a sensor within a period of time, or may correspond to information from a radio signal source obtained by the terminal device through scanning, for example, an identifier of the radio signal source and signal strength of the radio signal source.

(3) A track is a graph formed when a step point continuously changes with time, and may be discrete points, or may be a curve obtained by processing these discrete points.

(4) An inflection point is also referred to as a point of inflection, and is a point at which a direction is changed. For example, if a curve direction is upward before passing through a point and the curve direction is downward after passing through the point, the point may be referred to as an inflection point.

In addition, in descriptions of embodiments of this application, in the following, the terms "first" and "second" in embodiments of this application are merely used for a description purpose, and shall not be understood as an indication or implication of relative importance or implicit indication of a quantity of indicated technical features. Therefore, a feature limited by "first" or "second" may explicitly indicate or implicitly include one or more such features.

The following describes technical solutions in embodiments of this application with reference to the accompanying drawings in embodiments of this application.

FIG. 1 is a schematic diagram of an architecture of an indoor positioning scenario. The architecture of the scenario includes an electronic device 100 and a server 200 that are located in indoor space, and a plurality of radio signal sources (for example, an AP 1/AP 2/AP 3/AP 4) that are respectively located in different floor positions in the indoor space. The electronic device 100 and the server 200 may communicate with each other through a communications network. For example, the indoor space in FIG. 1 is a building, and the AP 1, the AP 2, the AP 3, and the AP 4 are respectively located on different floors. The server 200 may be one server, a server cluster including several servers, or a cloud server.

The communications network may be a wireless network or a wired network. When the communications network is a wired network, a plurality of radio signal sources further exist in a region. The electronic device 100 may communicate with the server 200 through the wired network. When the communications network is a wireless network, the communications network may be a local area network, or may be a wide area network connected by using a relay device, or may include a local area network and a wide area network. When the communications network is a local area network, for example, the communications network may be a network provided by the plurality of radio signal sources, or may be another near field communications network such as a Wi-Fi hotspot network, a Wi-Fi P2P network, a Bluetooth network, a zigbee network, or a near field communication (NFC) network. When the communications network is a wide area network, for example, the communications network may be a 3rd generation mobile telecommunications (3G) network, a 4th generation mobile telecommunications (4G) network, a 5th generation mobile telecommunications (5G) network, a future evolved public land mobile network (PLMN), or the Internet.

The server 200 may maintain an indoor map. The electronic device 100 scans for a radio signal source (for example, an AP 1/AP 2/AP 3/AP 4), to obtain a fingerprint of a current position, and sends the fingerprint to the server 200. The server 200 matches the fingerprint and the indoor map, to implement indoor positioning.

Currently, the indoor map may be generated in the following two manners.

Manner 1: A spatial relationship between specific types is established based on a specific behavior of a motion track obtained through machine learning, to form a sequence model, and map coordinate information is obtained through matching based on a point-line model of an indoor plane map, to establish the fingerprint of the indoor map.

Manner 2: A logical plan is generated through point combination based on a multipoint clustering result of detected received signal strength (RSS) sequences, and then the indoor map is generated by matching and superimposing the logical plan and a physical plan.

It can be learned that, in an existing indoor map generation technology, establishment of the indoor map depends on the indoor plane map, and is greatly affected by a structure of an indoor environment. Generation efficiency and an accuracy rate are low:

Based on the foregoing problem, an embodiment of this application provides an indoor map generation method. An indoor map is a map obtained by processing crowdsourcing by a server. FIG. 2 shows a collection process of crowdsourcing. A server 201 may publish a data collection task to a plurality of terminal devices such as a terminal device 202, a terminal device 204, and a terminal device 206. The terminal device 202, the terminal device 204, and the terminal device 206 may receive the data collection task published by the server 201, and perform data collection. For example, the server 201 publishes a task of collecting data of a building to the terminal device 202, the terminal device 204, and the terminal device 206. A user may receive the task on the terminal device 202, the terminal device 204, and the terminal device 206, arrive at the building, and move in the building. The terminal device 202, the terminal device 204, and the terminal device 206 may collect data in a process in which the user moves. For example, sensors such as a barometer, a magnetometer, a gyroscope, or an accelerometer in the terminal device 202, the terminal device 204, and the terminal device 206 may collect data in the process in which the user moves. After data collection ends, the terminal device 202, the terminal device 204, and the terminal device 206 may send the collected data to the server 201.

Figure 3:
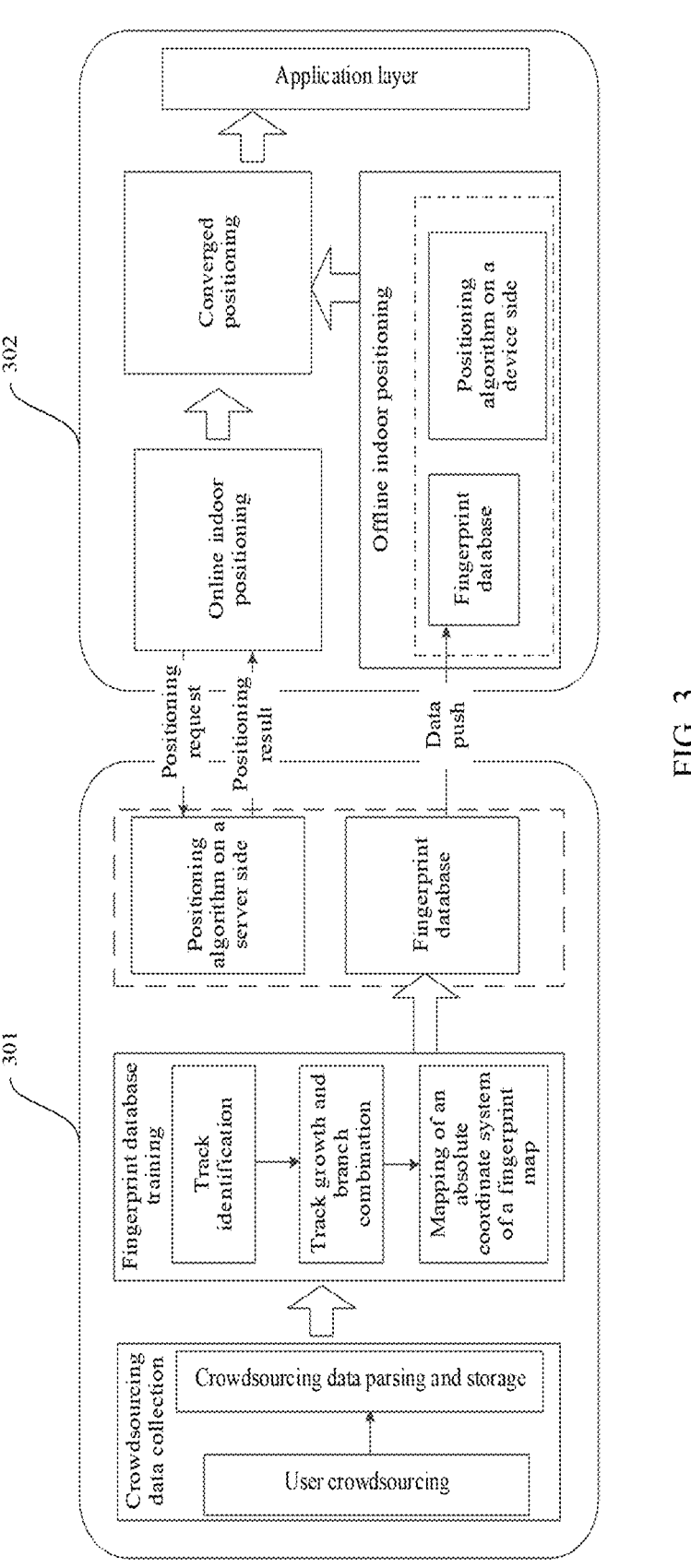
FIG. 3 is a diagram of a system architecture applicable to an embodiment of this application.

FIG. 3 is a diagram of a system architecture applicable to an embodiment of this application. The system architecture includes a server 301 and a terminal device 302. In this method, the server 301 may identify a plurality of first tracks from collected crowdsourcing based on a PDR algorithm. The first track herein may include a plurality of step points on a same floor of a building in a process of a position movement of the terminal device within a period of time. The server 301 may select a plurality of first target tracks from the plurality of first tracks, and extend, to the first target track based on each first target track, at least one second track corresponding to the first target track, to obtain one branch. The server 301 may combine a plurality of obtained branches, to obtain an indoor map. Because coordinates of the indoor map are coordinates in a relative coordinate system, the server 301 may further correct a coordinate system of the indoor map to obtain an absolute coordinate system. The map includes a correspondence between parameter information of a radio signal source and a position in the map.

Therefore, the server 301 may provide an indoor positioning service for the terminal device 302. For example, the terminal device 302 scans for a plurality of indoor radio signal sources (an AP 1 to an AP 4 shown in FIG. 1). When a positioning service is required, the terminal device 302 may send, to the server 301, parameter information of a radio signal source obtained through scanning. For example, the parameter information may be parameter information such as an identifier of the radio signal source obtained through scanning, signal strength of the radio signal source, and a frequency of the radio signal source. The terminal device 302 may add the parameter information to a positioning request message and send the positioning request message to the server 301. The server 301 may determine a position of the terminal device 302 on the map based on the parameter information. The server 301 may send a positioning result and the map to the terminal device 302 in response to the positioning request message of the terminal device 302. The terminal device 302 receives and displays the map, and may further display the positioning result on the map.

FIG. 4 is an example flowchart of an indoor map generation method according to an embodiment of this application. The method may include the following operations.

Operation 401: Obtain a plurality of first tracks from crowdsourcing based on information collected, within a period of time, by sensors in a plurality of terminal devices included in the crowdsourcing and based on a pedestrian dead reckoning (pedestrian dead reckoning, PDR) algorithm.

One first track indicates a curve including a position movement of one terminal device in the period of time, and the first track includes a plurality of step points of the terminal device on a same floor in a process of the position movement. The crowdsourcing includes information collected a sensor of the terminal device within the period of time. For example, the crowdsourcing includes at least one piece of the following information: acceleration that is of the terminal device and that is collected by an accelerometer within the period of time, a magnetic force value collected by a magnetometer within the period of time, or a barometric pressure value collected by a barometer within the period of time. Information that is about the sensor and that is carried in the crowdsourcing may be processed based on the PDR algorithm, to identify a plurality of tracks from the crowdsourcing. The plurality of tracks herein may include the first track, and may further include a third track. The third track includes a plurality of step points at at least one layer and another layer connected to the at least one layer in the process of the position movement of the terminal device. For example, the third track may include a step point at a layer A and a connection point of the layer A and the layer B. For another example, the third track may include a layer A, a layer B, and a step point at a connection point of the layer A and the layer B. For another example, the third track may include a step point at a layer A and a layer B.

Figure 5:
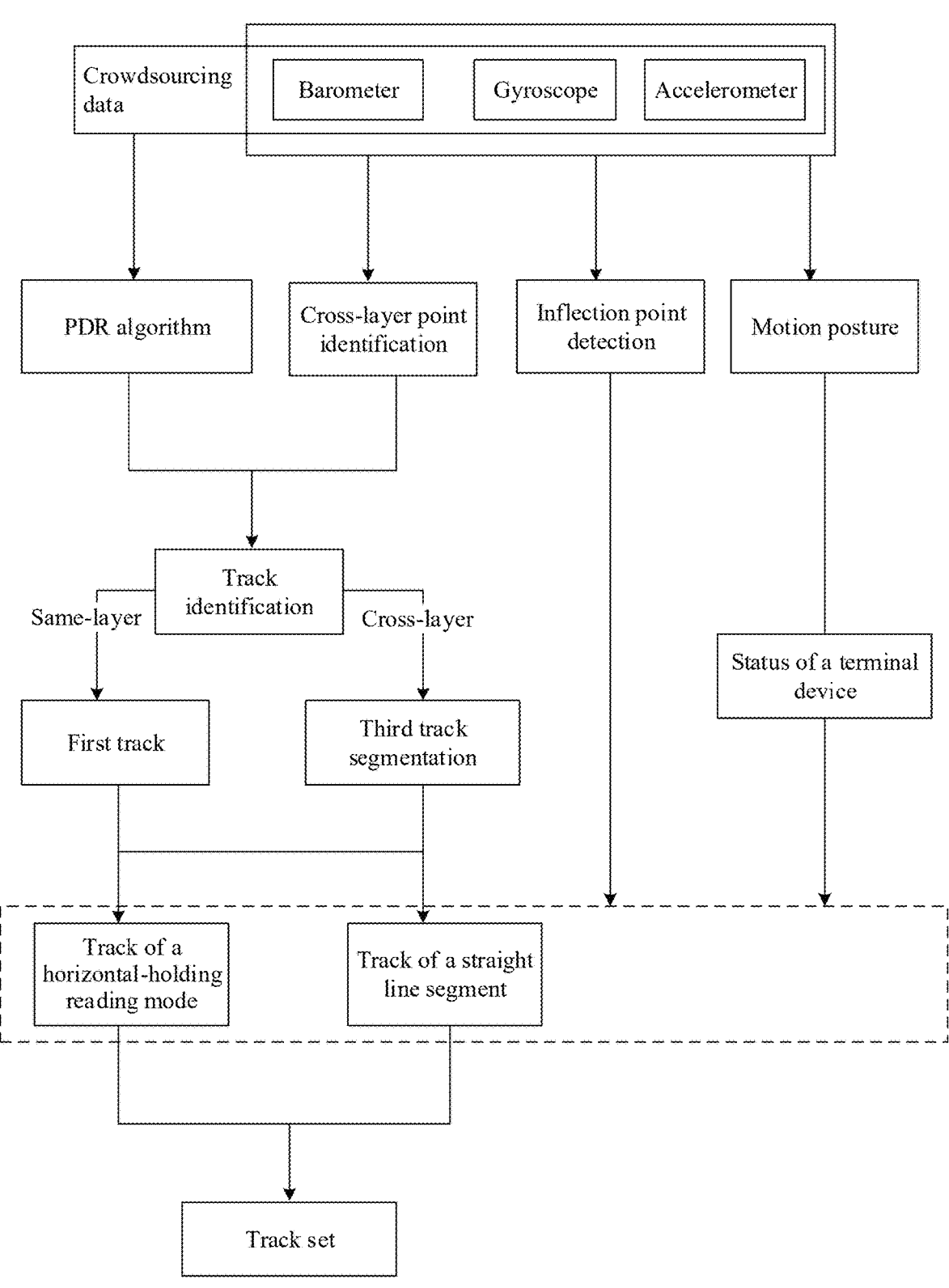
FIG. 5 is an example flowchart of an indoor map generation method according to an embodiment of this application.

The following describes a method for identifying the first track from the crowdsourcing. As shown in FIG. 5, the method may include the following several operations.

1. Identify a Track.

In this embodiment of this application, the plurality of tracks may be identified from the crowdsourcing based on the PDR algorithm and the information from the sensor of the terminal device. For example, the track may be identified based on the PDR algorithm and based on information collected by sensors such as the barometer, the gyroscope, the accelerometer, and the magnetometer shown in FIG. 5. In this case, the plurality of identified tracks include the first track and the third track. Therefore, whether a track is the first track may be further determined based on barometer information. For example, whether step points on the track belong to a same layer may be determined by calculating a difference between barometer information of two consecutive step points on the track. For example, a track 1 includes a step point 1 to a step point 10. A difference between barometer data of the step point 1 to a step point 5 is small, and falls within a preset range. Therefore, it may be considered that the step point 1 to the step point 5 are step points at a same layer. However, a difference between barometer data of a step point 6 and the step point 5 is large, and exceeds the preset range. Therefore, it may be considered that the step point 6 and the step point 5 are not step points at a same layer. Similarly, whether the step point 6 to the step point 10 are step points at a same layer may be determined in a same method. Because the track 1 includes the step point

5 and the step point 6 that do not belong to a same layer, it may be considered that the track 1 does not belong to the first track.

Figure 6:
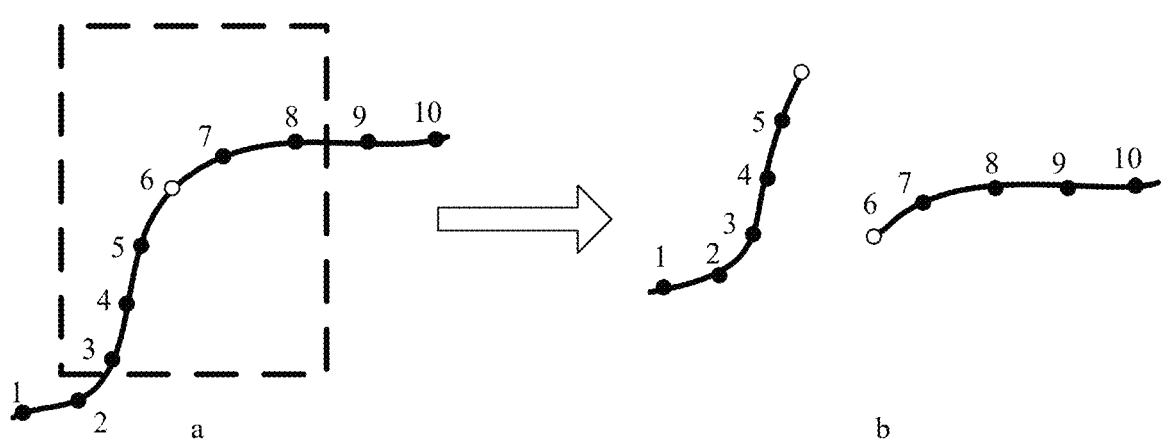
FIG. 6 is a schematic diagram of a third track according to an embodiment of this application.

Because the barometer information of the two consecutive step points is usually not stable, the first track may also be identified by using a sliding window: As shown in a in FIG. 6, a track may be displayed in the sliding window. A maximum value of a step point that may be displayed in the sliding window may be determined in advance based on an empirical value. In a in FIG. 6, six step points of the track 1 are displayed in the sliding window: First, a difference between barometer information of the six step points in the sliding window may be calculated. In other words, a difference between barometer information of two endpoints (a step point 8 and a step point 3) of the track in the sliding window may be calculated. If the difference is greater than or equal to a preset threshold, it may be determined that step points displayed in the sliding window do not belong to a same layer. In other words, the track 1 is not the first track, but belongs to the third track. Second, when it is determined that the step points displayed in the sliding window do not belong to a same layer, a difference between barometer information of two adjacent step points may be calculated. Step points with a maximum difference are cross-layer points of the track, for example, a hollow circle shown in a in FIG. 6.

2. Segment a Cross-Layer Track.

In this embodiment of this application, when it is determined, based on the barometer information, that the track is not the first track but the third track, the third track may be segmented, to obtain the first track. The cross-layer point may be identified from the third track based on the barometer information of the terminal device, and the second track is segmented based on the cross-layer point. For example, if a difference between barometer information of the step point 6 and the step point 5 in the track 1 is the largest, it may be considered that the step point 6 is a cross-layer point on the track 1. As shown in b in FIG. 6, when the third track is segmented, the third track may be segmented based on the step point 6.

The plurality of first tracks may be obtained based on 1 and 2, to generate an indoor map.

In this embodiment of this application, the information from the sensor and radio frequency fingerprint information each have a timestamp. Therefore, after the plurality of tracks are identified based on the PDR algorithm, the radio frequency fingerprint information may correspond to a step point based on the timestamp. One step point may correspond to a plurality of pieces of radio frequency fingerprint information. For example, when the terminal device obtains a plurality of radio signal sources through scanning at a same time point, there may be a plurality of pieces of radio frequency fingerprint information at the time point. However, there may be only one piece of information from the sensor. Therefore, radio frequency fingerprint information and a step point that exist at a same time point may correspond to each other. In addition, the radio frequency fingerprint information corresponding to the step point may also be referred to as a radio frequency fingerprint point. Therefore, the track in this embodiment of this application may include the step point and the radio frequency fingerprint point.

In addition, it should be noted that, in this embodiment of this application, an index may be established for the crowdsourcing, and the crowdsourcing is stored by using the index, to improve efficiency of obtaining the crowdsourcing. For example, crowdsourcing of different buildings may be stored separately based on global positioning system (GPS) information. Therefore, the index may be GPS information of the building. When an indoor map of a building needs to be generated, data of the building may be parsed. For example, the information from the sensor and radio frequency fingerprint information obtained by the terminal device through scanning may be obtained, and the information from the sensor and the radio frequency fingerprint information may be used in a subsequent indoor map generation procedure.

Operation 402: Select a plurality of first target tracks from the plurality of first tracks.

The first target track herein may be a track with a high accuracy rate in the plurality of first tracks. The high accuracy rate may be considered as follows: The track may accurately reflect a track of a motion curve of the terminal device. For example, if a track is short and includes only three or four step points, the track cannot accurately reflect the motion curve of the terminal device. Alternatively, if a track includes a large quantity of inflection points, the track cannot accurately reflect the motion curve of the terminal device, and it is difficult to generate the indoor map based on the track. Therefore, a plurality of first target tracks with a high accuracy rate may be selected from the plurality of first tracks, so that the first target track can accurately reflect the motion curve of the terminal device.

Refer to FIG. 5. Before the first target track is selected, the first track may be segmented. Because of a difference between user behaviors, a difference between crowdsourcing of terminal devices of a user is also large. Therefore, the first track may be segmented, to obtain a fourth track and/or a fifth track. The following describes a manner of segmenting the first track, and there may be the following two manners:

1. Segment the First Track, to Obtain the Fourth Track.

Figure 7:
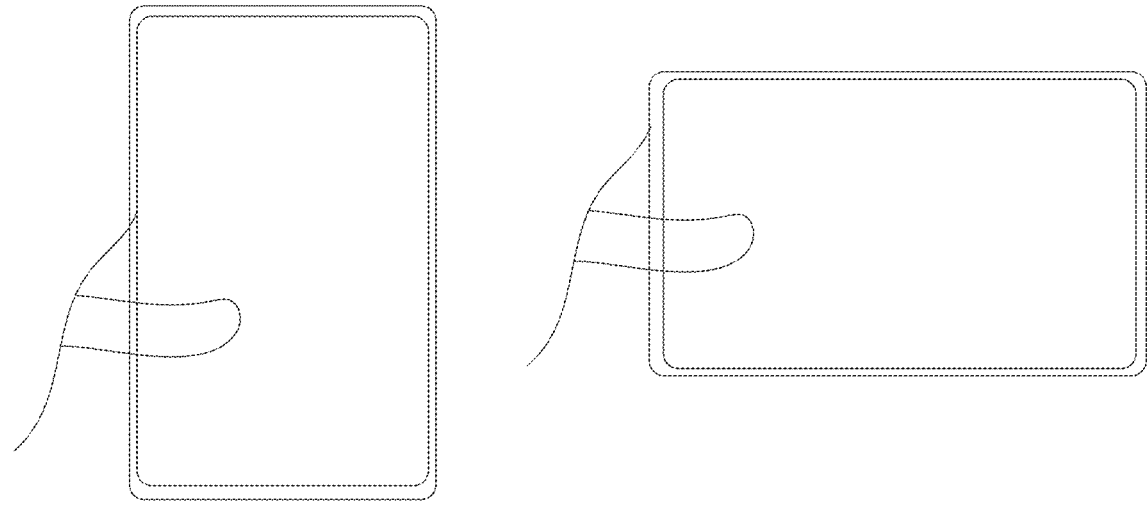
FIG. 7 is a schematic diagram of a scenario of a horizontal-holding reading mode according to an embodiment of this application.

The fourth track herein may be a track on which the information from the sensor changes stably in the first track. Because the track is identified based on the PDR algorithm and the information from the sensor, each track has information of a corresponding sensor, and each step point on the track has the information from the corresponding sensor. In this case, the fourth track may be determined from the first track based on a change in information from a sensor between step points on the first track. The fourth track may be a track corresponding to information from the sensor of the user in a horizontal-holding reading mode. As shown in FIG. 7, the user holds the terminal device horizontally in the horizontal-holding reading mode. In this case, a motion state of the terminal device and a motion state of a human body are similar. Therefore, noise in the information from the sensor of the terminal device is small.

Figure 8:
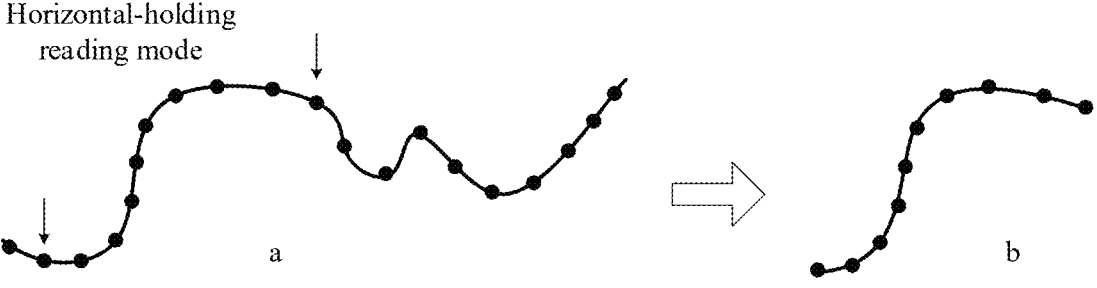
FIG. 8 is a schematic diagram of a fourth track according to an embodiment of this application.

As shown in a in FIG. 8, the fourth track may be identified from the first track based on the information from the sensor of the terminal device, and the first track is segmented, to obtain the fourth track, as shown in b in FIG. 8.

2. Segment the First Track, to Obtain the Fifth Track.

When the first track is segmented, the first track may be segmented based on an inflection point on the first track. The following describes how to detect the inflection point in the first track.

Figure 9:
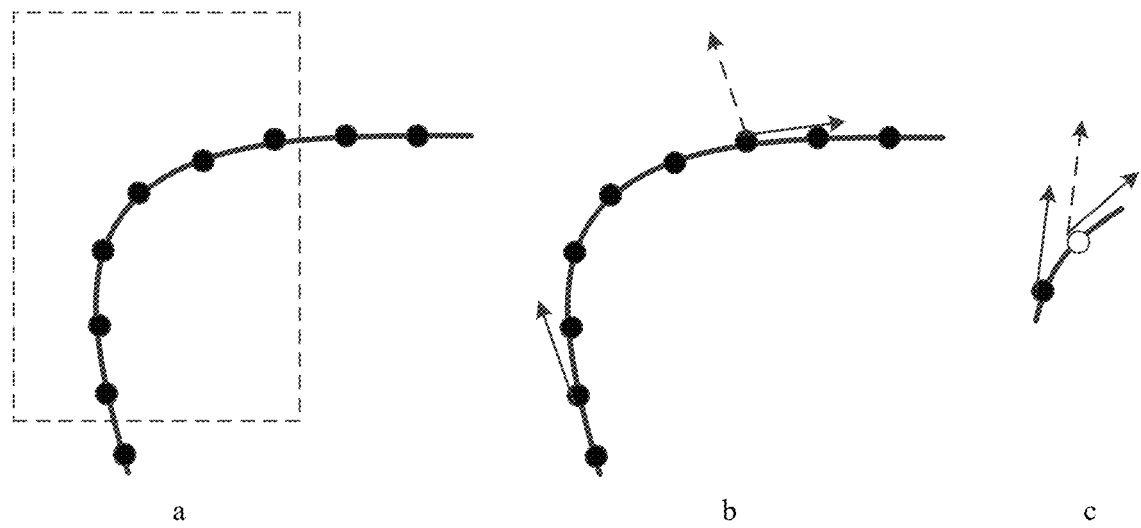
FIG. 9 is a schematic diagram of inflection point detection according to an embodiment of this application.

Because the first track is identified from the crowdsourcing based on the PDR algorithm, a step point on the first track corresponds to the information of the sensor, for example, information such as a motion direction of the step point, a relative position of the step point, and an instantaneous speed of the step point. The inflection point on the first track may be detected based on the sliding window. The maximum value of the step point that may be displayed in the sliding window may be determined in advance based on an empirical value. For example, the inflection point in the first track may be detected by using the sliding window whose maximum value is 6. As shown in a in FIG. 9, six step points on the first track are displayed in one sliding window (rectangle). First, as shown in b in FIG. 9, a motion direction difference $\theta_{window}$ of a track displayed in the sliding window may be calculated based on the step point in the sliding window; and Formula (1) may be satisfied.

$$\theta_{window} = abs(direction_a - direction_b) \qquad \text{Formula (1)}$$

Herein, $direction_a$ and directions are motion directions of the two endpoints of the track in the sliding window; and abs is to calculate an absolute value of $direction_a - direction_b$. Therefore, when $\theta_{window}$ is greater than or equal to a first specified value, it may be determined that an inflection point exists in the track in the sliding window.

Second, when it is determined that there is an inflection point on the track in the sliding window; a direction difference between adjacent step points on the track in the sliding window may be calculated. Step points with a maximum direction difference are inflection points on the track, for example, a hollow circle shown in c in FIG. 9.

After the inflection point on the track in the sliding window is detected, or when a value that is of $\theta_{window}$ in the sliding window and that is obtained through calculation is less than the first specified value, the sliding window is moved, and the inflection point on the first track continues to be detected.

Figure 10:
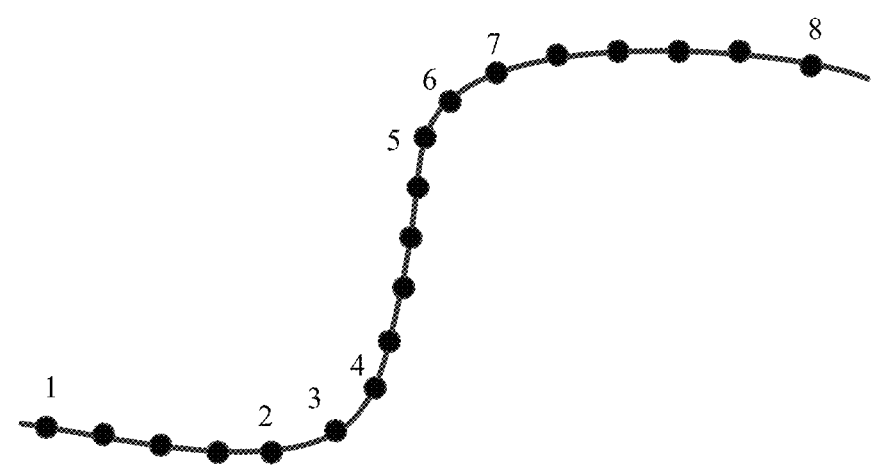
FIG. 10 is a schematic diagram of a fifth track according to an embodiment of this application.

After an inflection point in the first track is detected in the foregoing method, the first track may be segmented based on the inflection point, to obtain the fifth track. As shown in FIG. 10, the first track includes two inflection points. To segment the first track, the first track may be segmented by using the inflection point as a reference. For example, the first track is segmented by using a point 2 and a point 5 in FIG. 10 as a reference. Alternatively, the first track may be segmented by using a point adjacent to the inflection point as a reference. For example, the first track is segmented by using a point 1, a point 3, a point 4, and a point 5 in FIG. 10 as a reference.

In addition, it should be noted that when the first track is segmented, a first part of the first track may be segmented, to obtain the third track, and a second part of the first track may be segmented, to obtain the fourth track. The first part of the first track and the second part of the first track do not include a same first track. Therefore, the first track may be segmented separately based on 1 and 2, to obtain a set of the fourth track and the fifth track whose information noise about the sensor is small, for example, a track set shown in FIG. 5. The track set may be used in a subsequent indoor map generation procedure.

The following describes how to select the first target track from the set of the fourth track and the fifth track.

In an embodiment, the first target track may be randomly selected from the fourth track and the fifth track. Alternatively, a track whose length is greater than a specified value may be selected from the fourth track and the fifth track as the first target track.

Figure 11:
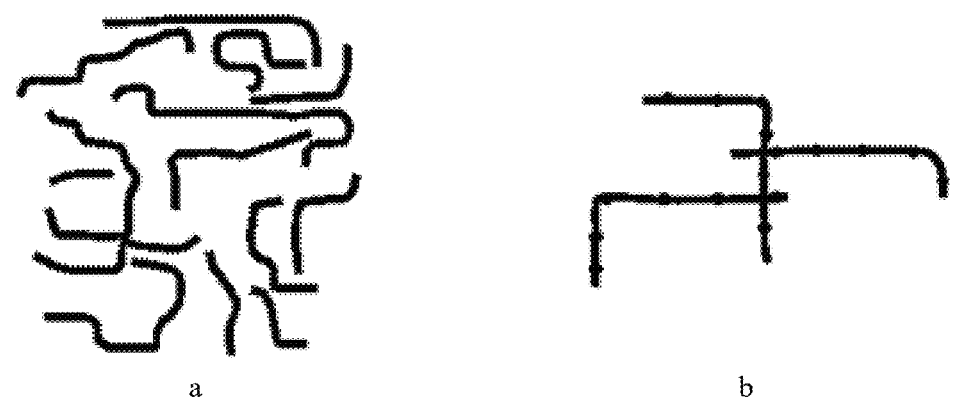
FIG. 11 is a schematic diagram of a first target track according to an embodiment of this application.

In another embodiment, each track may be scored based on information from a sensor of the fourth track and the fifth track, a length of the fourth track and a length of the fifth track, and an inflection point in the fourth track and the fifth track, and a track whose score is greater than or equal to a first value is used as the first target track. As shown in a in FIG. 11, a score of each track in the set of the fourth track and the fifth track may be calculated, and the first target track is selected based on the score. As shown in b in FIG. 11, three first target tracks are selected from the set of the fourth track and the fifth track based on the score. As shown in FIG. 11, compared with the track in the set of the fourth track and the fifth track shown in a in FIG. 11, the first target track may accurately represent the motion curve of the terminal device. Step points are uniformly distributed on the first target track, a quantity of inflection points on the track is not large, and a length of the track length is long.

Operation 403: Extend, to the first target track based on each first target track, at least one second track corresponding to the first target track, to obtain one branch.

The second track herein is a track that is in the first track and that may be combined with the first target track. For each first target track, another track different from the first target track in the track set shown in FIG. 5 may be matched with the first target track, to determine the second track.

In an embodiment, whether one of the other track and the first target track includes a same radio frequency fingerprint point may be determined. The same radio frequency fingerprint point may mean that radio signal sources obtained through scanning have a same identifier and have similar signal strength. For example, a difference between signal strength of two radio frequency fingerprint points falls within a specific range. The two radio frequency fingerprint points may be considered to be obtained by scanning for a same radio signal source in a same position. Therefore, a track that includes a same radio frequency fingerprint point as that on the first target track may be considered as a second track corresponding to the first target track, the radio frequency fingerprint point that is on the second track and that is the same as that on the first target track may be referred to as a first target radio frequency fingerprint point, and a radio frequency fingerprint point that is on the first target track and that is the same as the first target radio frequency fingerprint point is referred to as a first reference radio frequency fingerprint point. Therefore, the first track and the first target track may be combined based on the first reference radio frequency fingerprint point and the first target radio frequency fingerprint point.

Figure 12:
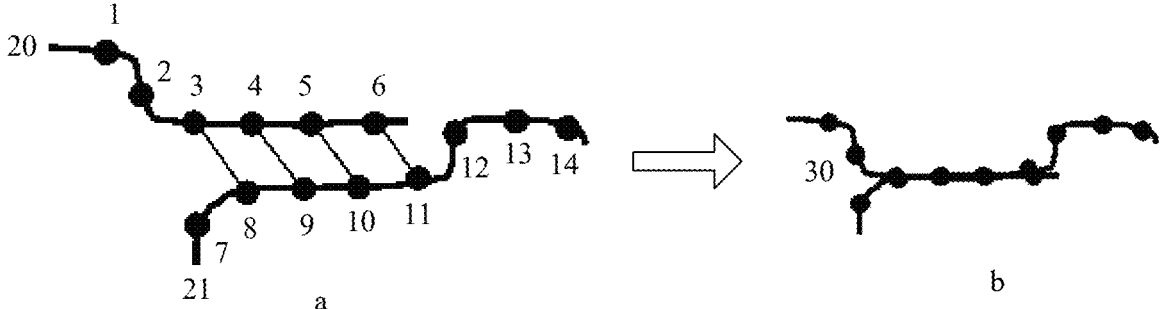
FIG. 12 is a schematic diagram of track growth according to an embodiment of this application.

Refer to FIG. 12. As shown in a in FIG. 12, a first target track 20 includes a radio frequency fingerprint point 1 to a radio frequency fingerprint point 6, and a second track 21 includes a radio frequency fingerprint point 7 to a radio frequency fingerprint point 14. It may be determined that a radio frequency fingerprint point 3 and a radio frequency fingerprint point 8 are same radio frequency fingerprint points, a radio frequency fingerprint point 4 and a radio frequency fingerprint point 9 are same radio frequency fingerprint points, a radio frequency fingerprint point 5 and a radio frequency fingerprint point 10 are same radio frequency fingerprint points, and the radio frequency fingerprint point 6 and a radio frequency fingerprint point 11 are same radio frequency fingerprint points. Therefore, same radio frequency fingerprint points on the track 20 and the track 21 may be combined, to obtain one branch shown in b in FIG. 12.

After combination, the branch obtained after the track 20 and the track 21 are combined may be matched with another track in the track set. For example, the branch shown in b in FIG. 12 may be referred to as a branch 30. The branch 30 may include the radio frequency fingerprint point 1 to the radio frequency fingerprint point 10. Therefore, a track that includes a radio frequency fingerprint point the same as the radio frequency fingerprint point 1 to the radio frequency fingerprint point 10 may be found from the other track, and may be combined with the branch 30. Alternatively, after combination, the first target track 20 may be further matched with the other track. For example, a second track on which a radio frequency fingerprint point is the same as the radio frequency fingerprint point 1 to the radio frequency fingerprint point 6 on the first target track 20 may be searched for, and may be combined with the first target track 20.

In another embodiment, a similarity between a radio frequency fingerprint point on the first target track and a radio frequency fingerprint point on the second track may be calculated. The similarity $$\text{Similar}\left(S_{ref}^i, S_{cur}^j\right)$$

satisfies the following formula:

$$\text{Similar}\left(S_{ref}^i, S_{cur}^j\right) = \exp\left(-\frac{d-A}{B}\right) \qquad \text{Formula (1)}$$

Herein, i=(1, 2, . . . , n), j=(1, 2, 3, . . . , m), A and B each are a constant, $$S_{ref}^i$$

represents an i$^{th}$ radio frequency fingerprint point on the first target track, and $$S_{cur}^j$$

represents a j$^{th}$ radio frequency fingerprint point on a j$^{th}$ second track. Herein, A and B may be predetermined based on an empirical value. For example, A may be 4.8, and B may be 8.0.

Herein, d is a distance between the i$^{th}$ radio frequency fingerprint point on the first target track and the j$^{th}$ radio frequency fingerprint point on the second track. The distance d satisfies Formula (2):

$$d = \frac{\sum_{k}^{P \cap Q}\left|Rssi_{ref}^i - Rssi_{cur}^j\right| \cdot w_k}{\sum_{k}^{P \cap q} w_k} \qquad \text{Formula (2)}$$

Herein, P represents a quantity of radio frequency fingerprint points on the first target track, Q represents a quantity of radio frequency fingerprint points on the second track, $$Rssi_{ref}^i$$

may represent signal strength of the i$^{th}$ radio frequency fingerprint point on the first target track, $$Rssi_{cur}^j$$

may represent signal strength of the j$^{th}$ radio frequency fingerprint point on the second track, and $w_k$ represents a weight of a $k^{th}$ radio signal source (access point, AP) corresponding to the $i^{th}$ radio frequency fingerprint point on the first target track and the $j^{th}$ radio frequency fingerprint point on the second track. It should be understood that a radio signal source corresponding to the radio frequency fingerprint point may be an AP obtained, through scanning, by the terminal device that obtains the radio frequency fingerprint point. For example, because the crowdsourcing further includes radio frequency fingerprint information, each piece of radio frequency fingerprint information may include an identifier and signal strength of the AP. Therefore, the radio frequency fingerprint point also corresponds to the identifier and the signal strength of the AP.

In this embodiment of this application, a similarity between the $i^{th}$ radio frequency fingerprint point on the first target track and the $j^{th}$ radio frequency fingerprint point on the second track may be calculated based on Formula (1) and Formula (2). When the obtained similarity is greater than a preset second value, it may be considered that the $i^{th}$ radio frequency fingerprint point on the first target track and the $j^{th}$ radio frequency fingerprint point on the second track are same radio frequency fingerprint points. Therefore, the two tracks may be combined. The second value may be determined in advance based on an empirical value. This is not specifically limited in this application.

Refer to FIG. 12. As shown in a in FIG. 12, it is learned, through calculation performed based on Formula (1) and Formula (2), that a similarity between the radio frequency fingerprint point 3 and the radio frequency fingerprint point 8 is greater than or equal to the second value, a similarity between the radio frequency fingerprint point 4 and the radio frequency fingerprint point 9 is greater than or equal to the second value, a similarity between the radio frequency fingerprint point 5 and the radio frequency fingerprint point 10 is greater than or equal to the second value, and a similarity between the radio frequency fingerprint point 6 and the radio frequency fingerprint point 11 is greater than or equal to the second value. Therefore, the first target track 20 and the second track 21 may be combined based on the eight radio frequency fingerprint points, to obtain one branch shown in b in FIG. 12.

After combination, the branch obtained after the track 20 and the track 21 are combined may be matched with another track in the track set. For example, the branch shown in b in FIG. 12 may be referred to as a branch 30. The branch 30 may include the radio frequency fingerprint point 1 to the radio frequency fingerprint point 10. Therefore, a track that includes a radio frequency fingerprint point the same as the radio frequency fingerprint point 1 to the radio frequency fingerprint point 10 may be found from the other track, and may be combined with the branch 30. Radio frequency fingerprint information corresponding to the radio frequency fingerprint point 3, the radio frequency fingerprint point 4, the radio frequency fingerprint point 5, and the radio frequency fingerprint point 6 of the branch 30 may be obtained from the first target track 20. For example, radio frequency fingerprint information of the radio frequency fingerprint point 3 of the branch 30 may be the same as the radio frequency fingerprint point 3 on the first target track 20, radio frequency fingerprint information of the radio frequency fingerprint point 4 of the branch 30 may be the same as the radio frequency fingerprint point 4 on the first target track 20, and so on. Alternatively, after combination, the first target track 20 may be further matched with the other track. For example, a similarity between a radio frequency fingerprint point on the other track and each of the radio frequency fingerprint point 1 to the radio frequency fingerprint point 6 on the first target track 20 may be calculated.

Because step frequencies and step lengths of different users are different, radio frequency fingerprint points are distributed differently at a same radio frequency fingerprint information sampling frequency. In other words, a radio frequency fingerprint point on each track has different coordinates. Therefore, after the first target track and the second track are combined, a coordinate system of the second track may be corrected to a coordinate system of the first target track.

In an embodiment, because the second track includes a radio frequency fingerprint point the same as that on the first target track, the coordinate system of the second track is corrected based on the radio frequency fingerprint point that is on the second track and that is the same as that on the first target track. As shown in b in FIG. 12, in the branch 30, coordinates of the radio frequency fingerprint point 1 and coordinates of the radio frequency fingerprint point 2 are in a coordinate system of the first target track 20, and coordinates of the radio frequency fingerprint point 7 and the radio frequency fingerprint point 12 to the radio frequency fingerprint point 14 are in a coordinate system of the second track 21. However, the radio frequency fingerprint point 3 to the radio frequency fingerprint point 6 have two pairs of coordinates, which are respectively in the coordinate system of the first target track 20 and the coordinate system of the second track 21. Therefore, transformation factors of the two coordinate systems may be calculated based on coordinates of the radio frequency fingerprint point 3 to the radio frequency fingerprint point 6 in different coordinate systems. Therefore, coordinates of the radio frequency fingerprint point 7 and the radio frequency fingerprint point 12 to the radio frequency fingerprint point 14 in the branch 30 may be corrected to coordinates in the coordinate system of the first target track 20.

In another embodiment, an error function between radio frequency fingerprint points on the first target track 20 and the second track 21 may be calculated. The error function F satisfies Formula (3):

$$F = \sum_{a=1}^{z} \left( S_{ref}^{i} - T \cdot S_{cur}^{j} \right)^2 \cdot w_k \qquad \text{Formula (3)}$$

Herein, z is a positive integer, and T is a similarity transformation between the $i^{th}$ radio frequency fingerprint point on the first target track and the $j^{th}$ radio frequency fingerprint point on the second track. A value of T may be adjusted, to obtain a minimum value of F. The similarity transformation T satisfies Formula (4):

$$T = \begin{bmatrix} s \cdot \cos\theta & s \cdot \sin\theta & t_x \\ -s \cdot \sin\theta & s \cdot \cos\theta & t_y \end{bmatrix} \qquad \text{Formula (4)}$$

Herein, s represents a scale factor, $\theta$ represents an angle at which the second track rotates relative to the first target track, $t_x$ represents a lateral translation amount of the second track relative to the first target track, and $t_y$ represents a longitudinal translation amount of the second track relative to the first target track. Therefore, the value of T can be adjusted by changing s, $\theta$, $t_x$, and $t_y$, to find a value of T that is used to obtain the minimum value of F.

The second track may be adjusted based on s, $\theta$, $t_x$, and $t_y$ that are calculated based on Formula (3) and Formula (4).

Figure 13:
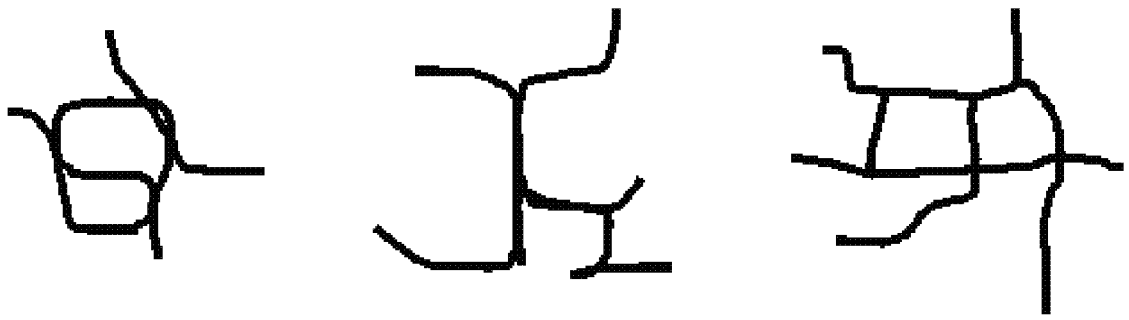
FIG. 13 is a schematic diagram of a branch according to an embodiment of this application.

In this embodiment of this application, three branches shown in FIG. 13 may be obtained by using operation 301 to operation 303.

Operation 404: Combine a plurality of branches obtained based on the plurality of first target tracks, to obtain a map.

When the plurality of branches are combined, one reference branch may be selected from the plurality of branches, and another branch is combined with the reference branch based on the reference branch.

In an embodiment, a radio frequency fingerprint point the same as a radio frequency fingerprint point included in the reference branch may be determined from a radio frequency fingerprint point of the other branch. For example, whether there is a radio frequency fingerprint point that has an identifier and signal strength of the AP that are the same as an identifier and signal strength of the AP of a radio frequency fingerprint point of the reference branch may be determined based on an identifier and signal strength of the AP of each radio frequency fingerprint point of the other branch. If there is a radio frequency fingerprint point that has an identifier and signal strength of the AP that are the same as an identifier and signal strength of the AP of a radio frequency fingerprint point of the reference branch, the radio frequency fingerprint points in the other branch may be used as a second target radio frequency fingerprint point. The radio frequency fingerprint point in the reference branch is used as a second reference radio frequency fingerprint point. The other branch is combined with the reference branch based on the second target radio frequency fingerprint point and the second reference radio frequency fingerprint point.

When the reference branch is selected, one branch may be randomly selected as the reference branch, or one branch that includes a largest quantity of first tracks may be used as the reference branch. Alternatively, for each branch, a quantity of radio frequency fingerprint points of the branch that are the same as those in the other branch may be calculated, and one branch that includes a largest quantity of same radio frequency fingerprint points is used as the reference branch.

For example, a branch 1, a branch 2, and a branch 3 are obtained by using operation 401 to operation 403. Therefore, for the branch 1, a quantity of radio frequency fingerprint points in the branch 1 that are the same as those in the branch 2 and a quantity of radio frequency fingerprint points in the branch 1 that are the same as those in the branch 3 may be separately determined. For the branch 2, a quantity of radio frequency fingerprint points in the branch 2 that are the same as those in the branch 3 may be determined. Therefore, a sum of the quantity of radio frequency fingerprint points in the branch 1 that are the same as those in the branch 2 and the quantity of radio frequency fingerprint points in the branch 1 that are the same as those in the branch 3, a sum of the quantity of radio frequency fingerprint points in the branch 2 that are the same as those in the branch 1 and the quantity of radio frequency fingerprint points in the branch 2 that are the same as those in the branch 3, and a sum of the quantity of radio frequency fingerprint points in the branch 3 that are the same as those in the branch 2 and the quantity of radio frequency fingerprint points in the branch 3 that are the same as those in the branch 1 may be calculated. A branch with a largest quantity sum in the three quantity sums may be searched for and used as the reference branch.

However, because one branch includes a plurality of tracks, and each track further includes a plurality of radio frequency fingerprint points, one branch includes a large quantity of radio frequency fingerprint points. According to the method, a time period for combining branches is greatly increased, and indoor map generation efficiency is reduced.

Figure 14:
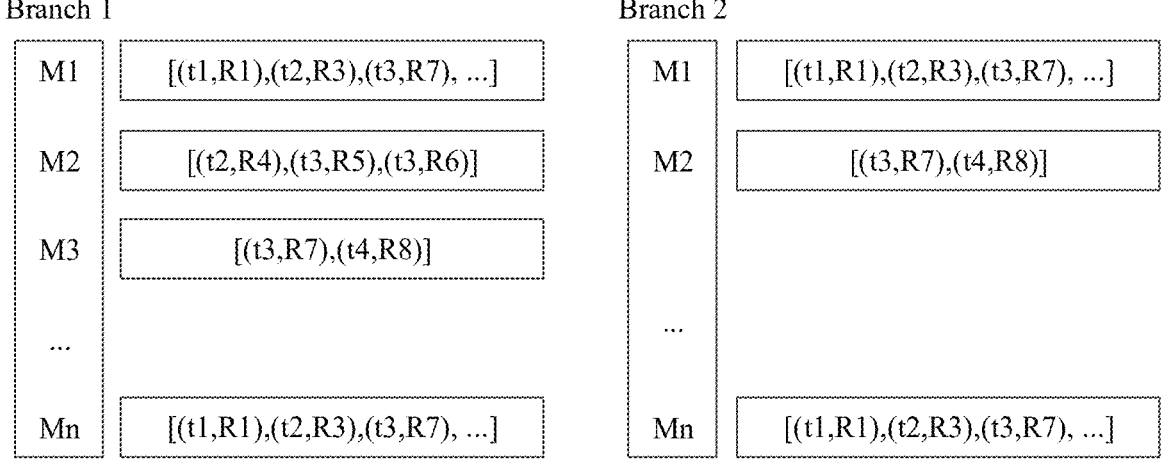
FIG. 14 is a schematic diagram of a structure of a hash table according to an embodiment of this application.

For this problem, in another embodiment, a hash table may be established for each branch. The hash table may be established by using a media access control (media access control, MAC) value of the AP as a key and by using a position and signal strength of a radio frequency fingerprint point as a value. As shown in FIG. 14, a hash table of the branch 1 is on a left side. A radio frequency fingerprint point that is of a MAC value 1 and that is obtained through scanning includes a radio frequency fingerprint point 1 (t1), where signal strength of the radio frequency fingerprint point 1 is R1, and further includes a radio frequency fingerprint point 2 (t2), where signal strength of the radio frequency fingerprint point 2 is R2. By analogy, the hash table of branch 1 may be obtained. A hash table of the branch 2 is on a right side in FIG. 14.

For the branch 1 and the branch 2, each hash table may be searched for radio frequency fingerprint points corresponding to a same MAC value. For example, as shown in FIG. 14, radio frequency fingerprint points corresponding to the MAC value 1 include t1, t2, and t3 of the branch 1, and t1, t2, and t3 of the branch 2. For each MAC value, the hash table may be searched for corresponding radio frequency fingerprint points in the branch 1 and branch 2. After radio frequency fingerprint points that are in the branch 1 and the branch 2 and that correspond to different MAC values are determined based on the hash table, a similarity between a radio frequency fingerprint point in the branch 1 and a radio frequency fingerprint point in the branch 2 that correspond to a same MAC value may be calculated based on Formula (1) and Formula (2). In addition, Table 1 may be obtained:

TABLE 1

| | Branch mapping table | | | | |
| --- | --- | --- | --- | --- | --- |
| | Branch 1 | Branch 2 | . . . | Branch k – 1 | Branch k |
| Branch 1 | | $\{(N_{ij},$ $Similar_{ij}),$ $M\}$ | . . . | | $\{(N_{ij},$ $Similar_{ij}),$ $M\}$ |
| Branch 2 | $\{(N_{ij},$ $Similar_{ij}),$ $M\}$ | | . . . | | $\{(N_{ij},$ $Similar_{ij}),$ $M\}$ |
| . . . | . . . | . . . | . . . | | . . . |
| Branch k – 1 | $\{(N_{ij},$ $Similar_{ij}),$ $M\}$ | $\{(N_{ij},$ $Similar_{ij}),$ $M\}$ | . . . | | $\{(N_{ij},$ $Similar_{ij}),$ $M\}$ |
| Branch k | $\{(N_{ij},$ $Similar_{ij}),$ $M\}$ | $\{(N_{ij},$ $Similar_{ij}),$ $M\}$ | | $\{(N_{ij},$ $Similar_{ij}),$ $M\}$ | |

In Table 1, M may represent a MAC value. $N_{ij}$ may be a quantity of radio frequency fingerprint points corresponding to a same value of M in one branch (for example, the branch 2) and another branch (for example, the branch 1), and $Similar_{ij}$ represents a similarity between an $i^{th}$ radio frequency fingerprint point corresponding to M in one branch (for example, the branch 2) and a $j^{th}$ radio frequency fingerprint point corresponding to M in another branch (for example, the branch 1)

To select the reference branch, a sum of $N_{ij}$ of one branch and all branches may be calculated, and a branch with a largest value is used as the reference branch. For example, a sum of $N_{ij}$ of the branch 1 and the branch 2 and $N_{ij}$ of the branch 1 and a branch k may be calculated, and a sum of $N_{ij}$ of the branch 2 and the branch 1 and $N_{ij}$ of the branch 2 and a branch k may be calculated. By analogy, a sum of $N_{ij}$ of the branch k and the branch 1 and $N_{ij}$ of the branch k and a branch k–1 may be calculated. A branch with a largest sum is selected from the branch 1 to the branch k is selected as the reference branch.

Figure 15:
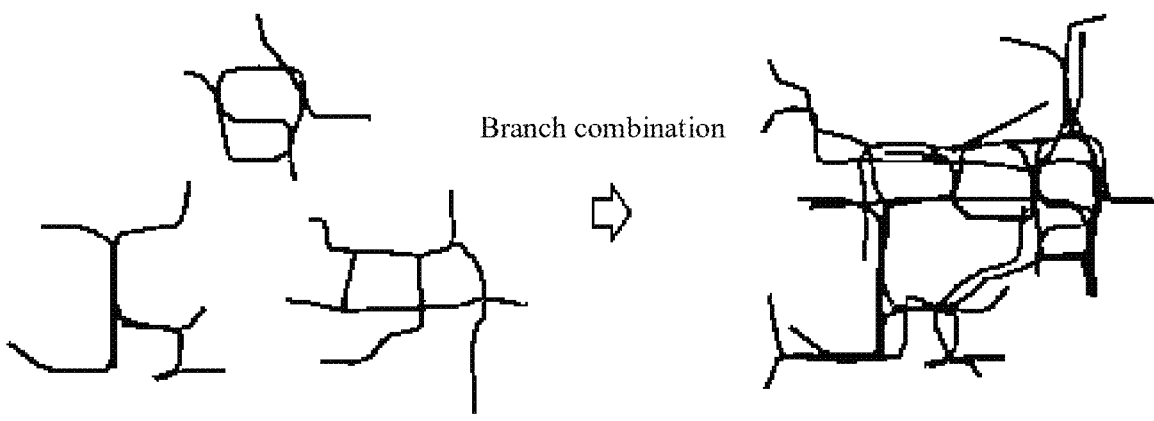
FIG. 15 is a schematic diagram of a map according to an embodiment of this application.

For each similarity $Similar_{ij}$, when the similarity is greater than or equal to a preset third value, it may be considered that the $i^{th}$ radio frequency fingerprint point corresponding to M in one branch (for example, the branch 2) and the $j^{th}$ radio frequency fingerprint point corresponding to M in another branch (for example, the branch 1) are same radio frequency fingerprint points. Then, the two branches may be combined based on the same radio frequency fingerprint points in the two branches. As shown in FIG. 15, the three branches shown in FIG. 13 may be combined into a fingerprint skeleton shown in FIG. 15.

Figure 16:
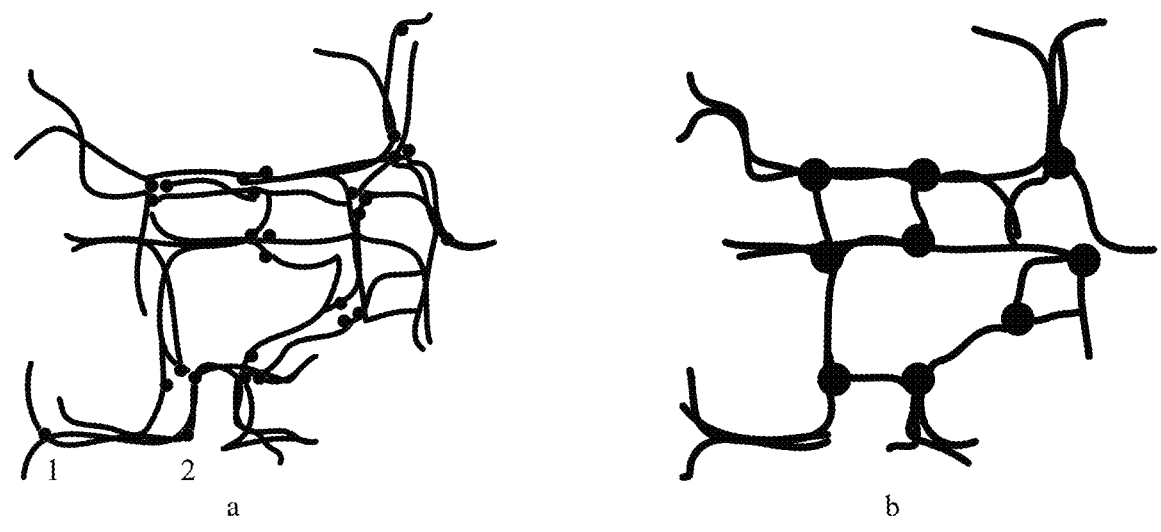
FIG. 16 is a schematic diagram of a map according to an embodiment of this application.

After the fingerprint skeleton shown in FIG. 15 is obtained, because some errors exist during track combination and branch combination, the obtained fingerprint skeleton is rough. Therefore, the fingerprint skeleton may be trimmed, to obtain an accurate fingerprint skeleton. Refer to FIG. 16. As shown in a in FIG. 16, because the inflection point on the first track is detected for each first track in the foregoing inflection point detection method, there are a plurality of inflection points in one fingerprint skeleton. Because the fingerprint skeleton is obtained by combining branches, and some branches overlap or intersect, some inflection points in the fingerprint skeleton are actually a same point, and are represented as a cluster of points distributed closely on the figure (a circled inflection point in a in FIG. 16). Therefore, a group of inflection points that are a same point may be clustered, and a plurality of clusters of points distributed closely may be clustered separately. A clustering center is obtained for a cluster of points. Alternatively, all the inflection points in the fingerprint skeleton may be clustered by using a spatial clustering algorithm, to learn of inflection points that may be one point in space. An inflection point in each cluster in a clustering result may be one point in the space. After a cluster of all the inflection points is obtained by using the spatial clustering algorithm, a plurality of clustering centers may be obtained.

For any first inflection point in the fingerprint skeleton, a track of the first inflection point may be traversed, to identify the second inflection point adjacent to the first inflection point. That the second inflection point is adjacent to the first inflection point herein does not mean that the second inflection point is spatially adjacent to the first inflection point, and instead, means that the second inflection point is adjacent to the first inflection point in terms of connectivity of a region. For example, an inflection point 1 and an inflection point 2 shown in a in FIG. 16 may be adjacent inflection points. After the second inflection point adjacent to the first inflection point is determined, a track between the first inflection point and the second inflection point may be corrected based on a first clustering center of the first inflection point and a second clustering center of the second inflection point. For example, the track between the first inflection point and the second inflection point may be scaled, translated, rotated, or the like, so that the first inflection point gets closer to the first clustering center, and the second inflection point gets closer to the second clustering center. As shown in b in FIG. 16, a trimmed fingerprint skeleton is more precise and aggregated than the fingerprint skeleton that exists before trimming as shown in a in FIG. 16.

In this embodiment of this application, a relative coordinate system of a first map obtained in operation 401 to operation 404 is corrected to a second map having an absolute coordinate system. The following describes a method for correcting the relative coordinate system to the absolute coordinate system, and may include Method 1 and Method 2.

Method 1: There is No Indoor Map.

Figure 17:
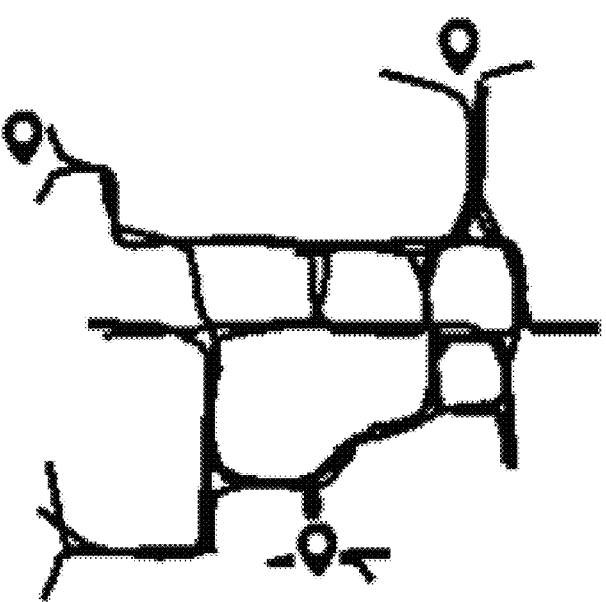
FIG. 17 is a schematic diagram of a map according to an embodiment of this application.

When there is no indoor map, the coordinate system of the first map may be corrected based on an entrance/exit position of the building. When the user enters the building, signal strength of the GPS of the terminal device of the user suddenly decreases, and when the user exits the building, the signal strength of the GPS of the terminal device of the user suddenly increases. Therefore, entrance/exit data can be identified from the crowdsourcing. Because the crowdsourcing corresponds to a timestamp, an entrance/exit position corresponding to each piece of entrance/exit data may be found in the first map based on a timestamp of the entrance/exit data. As shown in FIG. 17, the entrance/exit position of the building have longitude and latitude coordinates. Therefore, the coordinate system of the first map may be corrected to the absolute coordinate system based on the longitude and latitude coordinates of the entrance/exit position and coordinates of the entrance/exit position in the first map, to obtain a third map.

In an example, the first map may include a large quantity of entrance/exit positions. Therefore, the entrance/exit position may be clustered by using the spatial clustering algorithm, to obtain clustering centers of a plurality of entrance/exit positions. A clustering center of each clustering result may be used as an entrance/exit position in the first map, and the coordinate system of the first map is corrected to the absolute coordinate system based on longitude and latitude coordinates of the entrance/exit position.

Method 2: There is an Indoor Map.

Figure 18A:
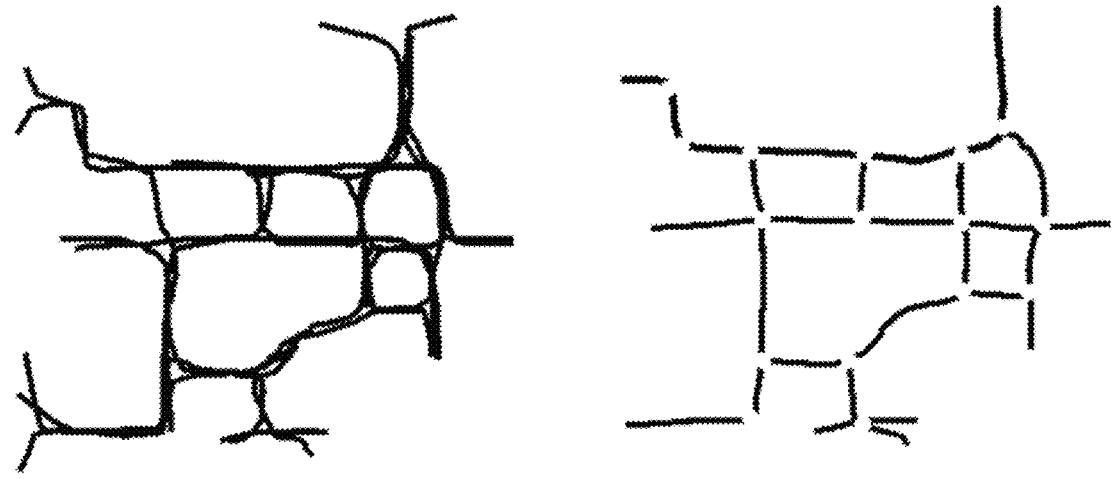
FIG. 18A is a topological map of a map according to an embodiment of this application.
Figure 18B:
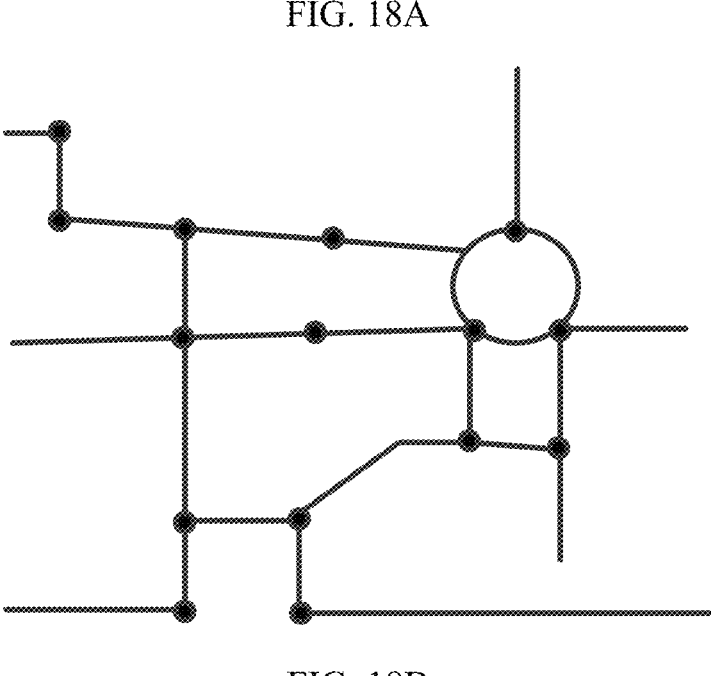
FIG. 18B is a topological map of an indoor map according to an embodiment of this application.
Figure 18C:
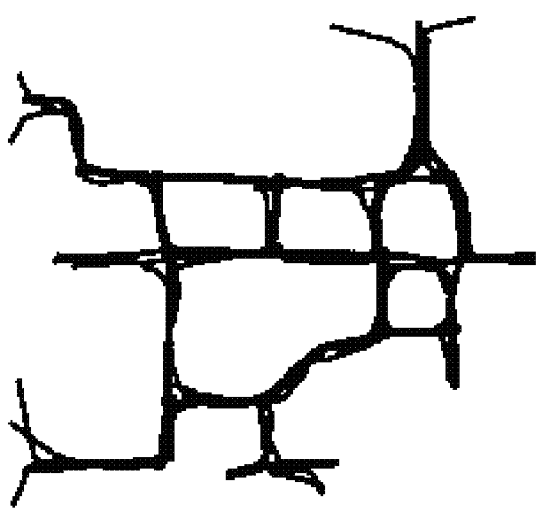
FIG. 18C is a schematic diagram of a matching result of a first topological map and a second topological map according to an embodiment of this application.

When there is an indoor map, the coordinate system of the first map may be corrected to the absolute coordinate system based on a first topological map of the first map and a second topological map of the indoor map. As shown in FIG. 18A, the first topological map of the first map may be obtained. As shown in FIG. 18B, the second topological map of the indoor map may be obtained. After the first topological map and the second topological map are obtained, the two topologies may be matched, to generate a matched point, as shown in FIG. 18C. The coordinate system of the first map may be corrected to the absolute coordinate system based on longitude and latitude coordinates of the matched point in the indoor map and coordinates of the matched point in the first map.

According to Method 1 and Method 2, if there is an indoor map, the coordinate system of the map may be corrected to the absolute coordinate system based on the indoor map, and if there is no indoor map, the coordinate system of the map may be corrected to the absolute coordinate system based on the longitude and latitude coordinates of the entrance/exit position. Therefore, the coordinate system of the map may not be corrected by depending on the indoor map.

Figure 19:
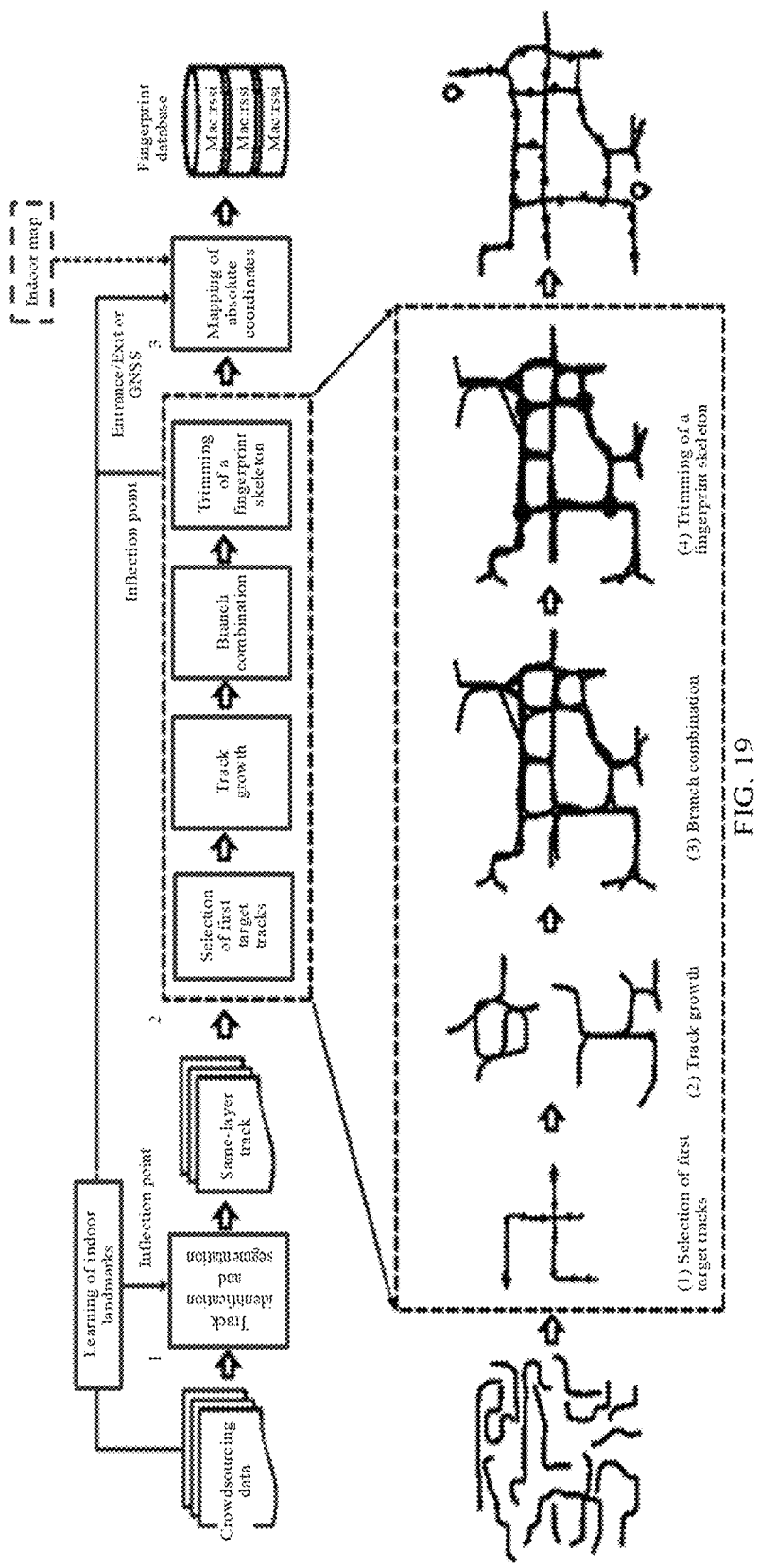
FIG. 19 is an example flowchart of an indoor map generation method according to an embodiment of this application.

The following describes, by using a specific embodiment, an indoor map generation method provided in an embodiment of this application. FIG. 19 is a schematic flowchart of an indoor map generation method according to an embodiment of this application.

As shown in FIG. 19, an indoor map may be obtained by using operation 1 to operation 3, and may also be referred to as a fingerprint database. The fingerprint database may correspond to latitude and longitude coordinates, a MAC value, and corresponding signal strength. After obtaining the fingerprint database, a terminal device may implement indoor positioning by using the fingerprint database. For example, the terminal device may scan for an AP, and send an identifier and signal strength of the AP to a positioning server. The positioning server may search the fingerprint database for a corresponding MAC value and signal strength based on the identifier and the signal strength of the AP that are sent by the terminal device, and return longitude and latitude coordinates corresponding to the found MAC value and signal strength to the terminal device.

Figure 20:
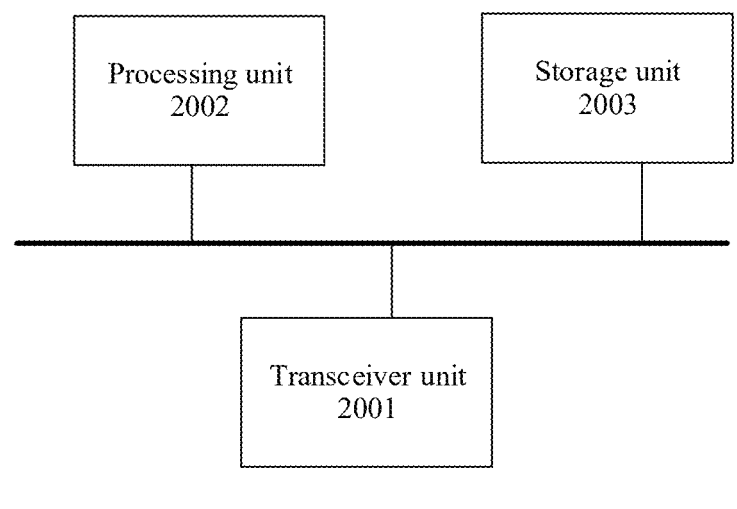
FIG. 20 is a schematic diagram of a structure of an indoor map generation apparatus according to an embodiment of this application.

Similar to the foregoing concept, as shown in FIG. 20, an embodiment of this application further provides an indoor map generation apparatus. The apparatus may implement the described map generation method. The apparatus 2000 includes a processing unit 2002 and a storage unit 2003. In an embodiment, the apparatus 2000 further includes a transceiver unit 2001. The transceiver unit may be configured to receive crowdsourcing reported by a terminal or crowdsourcing data sent by another device, and may be further configured to send a generated map to another device, for example, a network device or a terminal device. The processing unit 2002 may be connected to each of the storage unit 2003 and the transceiver unit 2001, and the storage unit 2003 may also be connected to the transceiver unit 2001. Alternatively, the processing unit 2002 may be integrated with the storage unit 2003.

The storage unit 2003 is configured to store a computer program.

For example, the processing unit 2002 is configured to: identify a plurality of first tracks based on information from a sensor of the terminal device and based on a pedestrian dead reckoning PDR algorithm within a period of time: select a plurality of first target tracks from the plurality of first tracks: connect, based on each first target track, the first target track and at least one second track corresponding to the first target track, to obtain one branch; and combine a plurality of branches obtained based on the plurality of first target tracks, to obtain a map. For descriptions of the first track, the first target track, and the second track, refer to related descriptions in the method embodiment shown in FIG. 4. Details are not described herein again.

In an embodiment, when the processing unit 2002 connects, based on each first target track, the first target track and the at least one second track corresponding to the first target track, to obtain one branch, the processing unit 2002 is configured to: for each first target track, extend, to the first target track based on a first radio frequency fingerprint point included on the first target track, a second track that includes a radio frequency fingerprint point matching the first radio frequency fingerprint point, to obtain one branch.

In an embodiment, the processing unit 2002 is further configured to correct, for each branch, a coordinate system of the second track to obtain a coordinate system of a first target track corresponding to the second track.

In an embodiment, when the processing unit 2002 combines the plurality of branches grown based on the plurality of first target tracks, to obtain the map, the processing unit 2002 is configured to combine the plurality of branches based on mutually matched radio frequency fingerprint points in the plurality of branches, to obtain the map. For related descriptions of the radio frequency fingerprint point and the branch, refer to descriptions in the method embodiment shown in FIG. 4. Repeated descriptions are not described again.

In an embodiment, the processing unit 2002 is further configured to obtain a plurality of third tracks based on the information collected by the sensors in the plurality of terminal devices within the period of time and based on the PDR algorithm. For related descriptions of the third track, refer to related descriptions in the method embodiment shown in FIG. 4. Repeated descriptions are not described again. The processing unit 2002 is further configured to segment each third track, to obtain the first track.

In an embodiment, when the processing unit 2002 combines the plurality of branches grown based on the plurality of first target tracks, to obtain the map, the processing unit 2002 is configured to: separately cluster a plurality of inflection points in a first map obtained by combining the plurality of branches, to obtain a clustering center of the plurality of inflection points, where the plurality of inflection points are located at a connection point of the plurality of branches in the first map: for a first inflection point, traverse a track passing through the first inflection point, to identify a second inflection point adjacent to the first inflection point, where the first inflection point is any inflection point in the first map, and a clustering center of the first inflection point is a first clustering center; and correct a track between the first inflection point and the second inflection point based on the first clustering center and a second clustering center, where the second clustering center is a clustering center of the second inflection point.

The apparatus 2000 may alternatively be a chip. The transceiver unit may be an input/output circuit or an interface of the chip. The processing unit may be a logic circuit. The logic circuit may process to-be-processed data based on operations described in the method aspects, to obtain processed data. The to-be-processed data may be data received by the input circuit/interface, for example, the information collected by the sensors in the plurality of terminal devices within the period of time. The processed data may be data obtained based on the to-be-processed data, for example, an indoor map.

Figure 21:
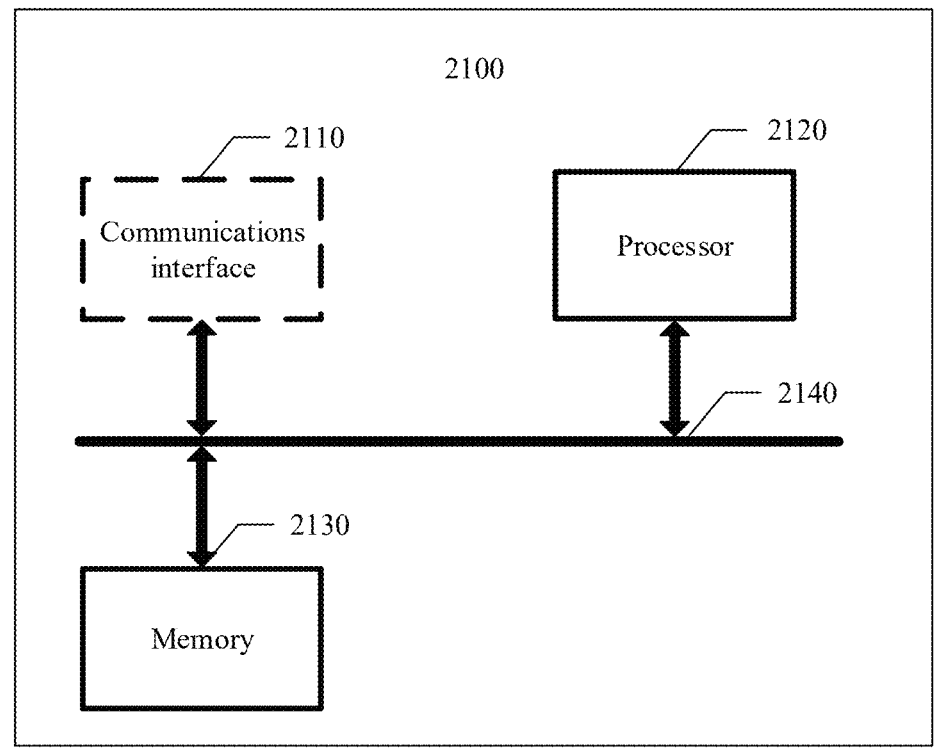
FIG. 21 is a schematic diagram of a structure of an indoor map generation apparatus according to an embodiment of this application.

Similar to the foregoing concept, an embodiment of this application further provides an indoor map generation apparatus. FIG. 21 is a schematic diagram of a structure of an apparatus according to an embodiment of this application. The apparatus 2100 includes at least one processor 2120, configured to implement a function in the method provided in embodiments of this application. The apparatus 2100 may further include a communications interface 2110. In this embodiment of this application, the communications interface may be a transceiver, a circuit, a bus, a module, or another type of communications interface, and is configured to communicate with another device by using a transmission medium. For example, the communications interface 2110 is used for communication between an apparatus in the apparatus 2000 and the other device. The processor 2120 may complete a function of the processing unit 2002 in FIG. 20, and the communications interface 2110 may complete a function of the transceiver unit 2001 in FIG. 20.

The communications apparatus 2100 may further include at least one memory 2130, configured to store program instructions and/or data. The memory 2130 is coupled to the processor 2120. The coupling in this embodiment of this application is indirect coupling or a communications connection between apparatuses, units, or modules for information exchange between the apparatuses, the units, or the modules, and may be in electrical, mechanical, or other forms. The processor 2120 may perform a cooperative operation with the memory 2130. The processor 2120 may execute the program instructions stored in the memory 2130. At least one of the at least one memory may be included in the processor.

A specific connection medium between the communications interface 2110, the processor 2120, and the memory 2130 is not limited in this embodiment of this application. In this embodiment of this application, in FIG. 21, the memory 2130, the processor 2120, and the transceiver 2110 are connected by using a bus 2140, and the bus is represented by using a bold line in FIG. 21. A connection manner between other parts is merely an example for description, and does not impose a limitation. The bus may be classified into an address bus, a data bus, a control bus, and the like. For ease of representation, only one bold line is used for representation in FIG. 21, but this does not mean that there is only one bus or only one type of bus.

The apparatus may perform the map generation method described in embodiments of this application. For a specific embodiment and technical effects, refer to the foregoing descriptions. Details are not described herein again.

In another form of this embodiment, a computer-readable storage medium is provided. The computer-readable storage medium stores instructions, and when the instructions are executed, the method described in the method embodiments is performed.

In another form of this embodiment, a computer program product including instructions is provided. When the instructions are executed, the method described in the method embodiments is performed.

It should be understood that, the processor mentioned in embodiments of this application may be a Central Processing Unit (CPU), or may be another general-purpose processor, a Digital Signal Processor (DSP), an Application-specific Integrated Circuit (ASIC), a Field Programmable Gate Array (FPGA), another programmable logic device, a discrete gate, a transistor logic device, a discrete hardware component, or the like. The general-purpose processor may be a microprocessor, or the processor may be any conventional processor or the like.

It may be understood that the memory mentioned in embodiments of this application may be a volatile memory or a non-volatile memory, or may include a volatile memory and a non-volatile memory. The non-volatile memory may be a Read-Only Memory (ROM), a Programmable ROM (PROM), an erasable programmable read-only memory (Erasable PROM, EPROM), an electrically erasable programmable read-only memory (Electrically EPROM, EEPROM), or a flash memory. The volatile memory may be a Random Access Memory (RAM) and is used as an external cache. Through example but not limitative description, a plurality of forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that when the processor is a general-purpose processor, a DSP, an ASIC, an FPGA, or another programmable logic device, a discrete gate, a transistor logic device, or a discrete hardware component, the memory (a storage module) is integrated into the processor.

It should be noted that the memory described in this specification is intended to include but not limited to these memories and any memory of another appropriate type.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in another manner. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the operations of the methods described in embodiments of this application. The foregoing storage medium includes: any medium that can store program code, such as a USB flash drive, a removable hard disk, a ROM, a RAM, a magnetic disk, or an optical disc.

The foregoing description is merely a specific embodiment of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A computer-implemented method of indoor map generation, the method comprising:

identifying a plurality of first tracks based on information received from sensors of a plurality of terminal devices within a period of time and a pedestrian dead reckoning (PDR) algorithm, wherein each first track of the plurality of first tracks represents a curve comprising a position movement of a terminal device, of the plurality of terminal devices, within the period of time, and the first track comprises a plurality of step points of the terminal device on a same floor of a building in a process of the position movement;

for each first track of the plurality of first tracks, segmenting the first track, to identify a set of fourth tracks, based on a change in information from at least one of the sensors, and segmenting the first track, to identify a set of fifth tracks, based on one or more inflection points on the first track;

selecting, from sets of fourth tracks and sets of fifth tracks identified from the plurality of first tracks, a plurality of first target tracks, wherein an accuracy rate of the plurality of first target tracks is higher than an accuracy rate of a plurality of second tracks from the plurality of first tracks;

for each first target track, connecting the first target track to at least one second track corresponding to the first target track, to generate a branch, wherein the branch comprises the first target track and the at least one second track corresponding to the first target track; and generating an indoor map for indoor positioning by combining the generated branches.

2. The method according to claim 1, wherein each first target track comprises a radio frequency fingerprint point that indicates a radio signal source obtained by one of the plurality of terminal devices through scanning in the process of the position movement, and a radio frequency fingerprint point comprised on the at least one second track corresponding to the first target track that matches a radio frequency fingerprint point on the first target track.

3. The method according to claim 2, wherein the at least one second track comprises a radio frequency fingerprint point matching a first radio frequency fingerprint point comprised on the first target track.

4. The method according to claim 1, further comprising:

for each branch of the generated branches, correcting a coordinate system of the at least one second track to a coordinate system of the first target track corresponding to the at least one second track.

5. The method according to claim 1, wherein each first track comprises a radio frequency fingerprint point that indicates a radio signal source obtained by one of the plurality of terminal devices through scanning in the process of the position movement; and combining the generated branches comprises:

combining the generated branches based on mutually matched radio frequency fingerprint points in the generated branches.

6. The method according to claim 1, wherein there is a mapping relationship between an identifier of a radio frequency fingerprint point of the branch, signal strength, and a media access control (MAC) value, and the radio frequency fingerprint point indicates a radio signal source obtained by the terminal device through scanning in the process of the position movement.

7. The method according to claim 6, wherein mutually matched radio frequency fingerprint points of at least two branches of the generated branches correspond to a same MAC value, and a difference between signal strength of the mutually matched radio frequency fingerprint points falls within a preset range.

8. The method according to claim 1, wherein identifying the plurality of first tracks comprises:

identifying a plurality of third tracks based on the information received from the sensors in the plurality of terminal devices within the period of time and the PDR algorithm, wherein a third track represents a curve comprising the position movement of the terminal device in the period of time, and the third track comprises step points of the terminal device on a plurality of floors in the process of the position movement; and segmenting each third track by floor, to obtain the plurality of first tracks.

9. The method according to claim 1, wherein the plurality of first target tracks are tracks whose scores are higher than a first threshold in the sets of fourth tracks, and a fourth track is part of a first track and whose accuracy rate is higher than a second threshold.

10. The method according to claim 1, wherein the plurality of first target tracks are tracks whose scores are higher than a third threshold in the sets of fifth tracks; and prior to segmenting the first track, to identify the set of fifth tracks, based on the one or more inflection points on the first track, the method further comprises:

detecting the one or more inflection points on the first track using a sliding window.

11. The method according to claim 1, wherein combining the generated branches comprises:

separately clustering a plurality of inflection points in a first map obtained by combining the generated branches, to obtain a clustering center of the plurality of inflection points, wherein the plurality of inflection points are located at a connection point of the generated branches in the first map;

for a first inflection point, traversing a track passing through the first inflection point, to identify a second inflection point adjacent to the first inflection point, wherein the first inflection point is an inflection point in the first map, and a clustering center of the first inflection point is a first clustering center; and correcting a track between the first inflection point and the second inflection point based on the first clustering center and a second clustering center, wherein the second clustering center is a clustering center of the second inflection point.

12. The method according to claim 1, wherein the information collected by the sensors in the plurality of terminal devices within the period of time comes from crowdsourcing data collected by the plurality of terminal devices.

13. An indoor map generation device, comprising:

at least one processor; and at least one memory coupled to the at least one processor to store program instructions, which when executed by the at least one processor, cause the at least one processor to:

identify a plurality of first tracks based on information received from sensors of a plurality of terminal devices within a period of time and a pedestrian dead reckoning (PDR) algorithm, wherein each first track of the plurality of first tracks represents a curve comprising a position movement of a terminal device, of the plurality of terminal devices, within the period of time, and the first track comprises a plurality of step points of the terminal device on a same floor of a building in a process of the position movement;

for each first track of the plurality of first tracks, segment the first track, to identify a set of fourth tracks, based on a change in information from at least one of the sensors, and segment the first track, to identify a set of fifth tracks, based on one or more inflection points on the first track;

select, from sets of fourth tracks and sets of fifth tracks identified from the plurality of first tracks, a plurality of first target tracks, wherein an accuracy rate of the plurality of first target tracks is higher than an accuracy rate of a plurality of second tracks from the plurality of first tracks;

for each first target track, connect the first target track to at least one second track corresponding to the first target track, to generate a branch, wherein the branch comprises the first target track and the at least one second track corresponding to the first target track; and generate an indoor map for indoor positioning based on a combination of the generated branches.

14. The indoor map generation device according to claim 13, wherein each first target track comprises a radio frequency fingerprint point that indicates a radio signal source obtained by one of the plurality of terminal devices through scanning in the process of the position movement, and a radio frequency fingerprint point comprised on the at least one second track corresponding to the first target track that matches a radio frequency fingerprint point on the first target track.

15. The indoor map generation device according to claim 14, wherein the at least one second track comprises a radio frequency fingerprint point matching a first radio frequency fingerprint point comprised on the first target track.

16. The indoor map generation device according to claim 13, wherein the program instructions, which when executed by the at least one processor, further cause the at least one processor to:

for each branch of the generated branches, correct a coordinate system of the at least one second track to a coordinate system of the first target track corresponding to the at least one second track.

17. A non-transitory computer-readable storage medium, storing one or more instructions that, when executed by at least one processor, cause the at least one processor to:

identify a plurality of first tracks based on information received from sensors of a plurality of terminal devices within a period of time and a pedestrian dead reckoning (PDR) algorithm, wherein each first track of the plurality of first tracks represents a curve comprising a position movement of a terminal device, of the plurality of terminal devices, within the period of time, and the first track comprises a plurality of step points of the terminal device on a same floor of a building in a process of the position movement;

for each first track of the plurality of first tracks, segment the first track, to identify a set of fourth tracks, based on a change in information from at least one of the sensors, and segment the first track, to identify a set of fifth tracks, based on one or more inflection points on the first track;

select, from sets of fourth tracks and sets of fifth tracks identified from the plurality of first tracks, a plurality of first target tracks, wherein an accuracy rate of the plurality of first target tracks is higher than an accuracy rate of a plurality of second tracks from the plurality of first tracks;

for each first target track, connect the first target track to at least one second track corresponding to the first target track, to generate a branch, wherein the branch comprises the first target track and the at least one second track corresponding to the first target track; and generate an indoor map for indoor positioning based on a combination of the generated branches.

18. The non-transitory computer-readable storage medium according to claim 17, wherein each first target track comprises a radio frequency fingerprint point that indicates a radio signal source obtained by one of the plurality of terminal devices through scanning in the process of the position movement, and a radio frequency fingerprint point comprised on the at least one second track corresponding to the first target track that matches a radio frequency fingerprint point on the first target track.

19. The non-transitory computer-readable storage medium according to claim 18, wherein the at least one second track comprises a radio frequency fingerprint point matching a first radio frequency fingerprint point comprised on the first target track.

20. The non-transitory computer-readable storage medium according to claim 17, wherein the one or more instructions that, when executed by the at least one processor, further cause the at least one processor to:

for each branch of the generated branches, correct a coordinate system of the at least one second track to a coordinate system of the first target track corresponding to the at least one second track.

* * * * *